United States Patent
Wu

(10) Patent No.: US 11,951,833 B1
(45) Date of Patent: Apr. 9, 2024

(54) INFOTAINMENT SYSTEM PERMISSION CONTROL WHILE DRIVING USING IN-CABIN MONITORING

(71) Applicant: Ambarella International LP, Santa Clara, CA (US)

(72) Inventor: I-Chieh Wu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 419 days.

(21) Appl. No.: 17/321,473

(22) Filed: May 16, 2021

(51) Int. Cl.
| | |
|---|---|
| *G06N 3/08* | (2023.01) |
| *B60K 35/00* | (2006.01) |
| *G06V 20/40* | (2022.01) |
| *G06V 20/59* | (2022.01) |
| *G06V 40/10* | (2022.01) |
| *G06V 40/20* | (2022.01) |

(52) U.S. Cl.
CPC .............. *B60K 35/00* (2013.01); *G06N 3/08* (2013.01); *G06V 20/46* (2022.01); *G06V 20/597* (2022.01); *G06V 40/107* (2022.01); *G06V 40/28* (2022.01); *B60K 2370/1438* (2019.05); *B60K 2370/164* (2019.05); *B60K 2370/197* (2019.05); *B60K 2370/741* (2019.05)

(58) Field of Classification Search
None
See application file for complete search history.

(56) References Cited

U.S. PATENT DOCUMENTS

| | | | |
|---|---|---|---|
| 2013/0033448 A1* | 2/2013 | Yano | G06F 3/018 345/173 |
| 2014/0164559 A1* | 6/2014 | Demeniuk | H04L 67/10 709/217 |
| 2018/0373953 A1* | 12/2018 | Tomotaki | G06T 7/0002 |
| 2020/0001812 A1* | 1/2020 | Cho | G06V 40/23 |
| 2021/0397859 A1* | 12/2021 | Arora | G06V 10/143 |
| 2022/0207356 A1* | 6/2022 | Kim | G06F 17/16 |

\* cited by examiner

*Primary Examiner* — James M McPherson
(74) *Attorney, Agent, or Firm* — Christopher P. Maiorana, PC

(57) ABSTRACT

An apparatus comprising an interface and a processor. The interface may be configured to receive pixel data of an interior of a vehicle. The processor may be configured to process the pixel data arranged as video frames, perform computer vision operations to detect objects in the video frames, extract characteristics about the objects detected, associate movement of a body part to a particular person and generate a control signal in response to the movement of the body part. A device is configured to operate in a locked mode that prevents input when the vehicle is in motion. The control signal is configured to enable the device to receive the input when the device is in the locked mode. The control signal may be generated only when the particular person associated with the movement corresponds to an occupant in the vehicle that is not a driver of the vehicle.

20 Claims, 13 Drawing Sheets

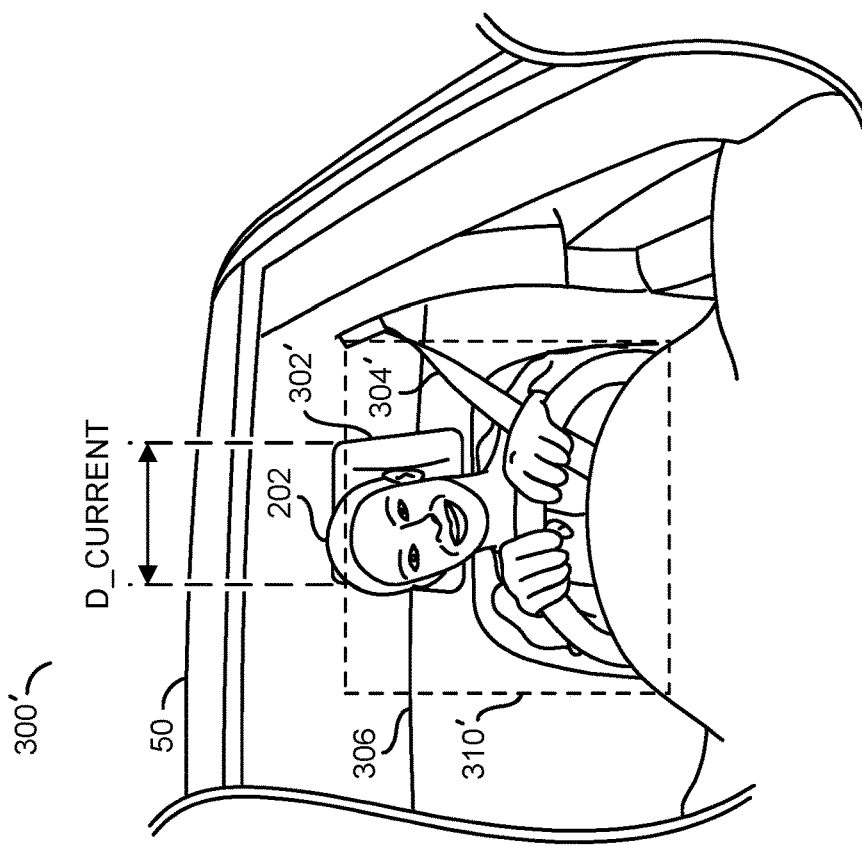
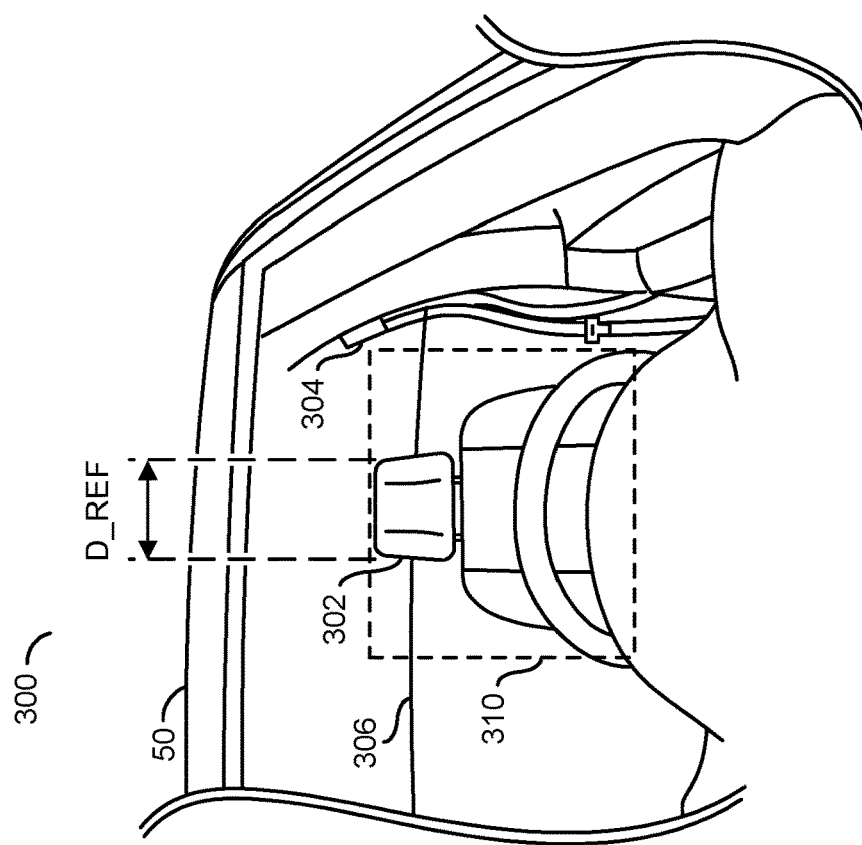
FIG. 4

US 11,951,833 B1

INFOTAINMENT SYSTEM PERMISSION CONTROL WHILE DRIVING USING IN-CABIN MONITORING

FIELD OF THE INVENTION

The invention relates to computer vision generally and, more particularly, to a method and/or apparatus for implementing an infotainment system permission control while driving using in-cabin monitoring.

BACKGROUND

Distracted driving is dangerous. While improvements in technology are used to improve vehicular safety (i.e., improved physical design of vehicles, sensing more data for notifying drivers of potential issues, driver assistance, etc.), improvements in technology are also capable of distracting drivers (i.e., smartphones, additional entertainment options, etc.). One potential source of distraction for drivers is the infotainment system.

Conventional controls for vehicles have been implemented using physical buttons and knobs. Physical buttons and knobs have an advantage of tactile feedback that enables some drivers to control various in-vehicle features without looking (i.e., change a radio station). However, each vehicle has a different layout for the controls and drivers that are unfamiliar with a vehicle have to look at the controls to adjust various features. An infotainment system has some advantages over traditional physical controls. Touchscreens further allow the layout for controls to be standardized (although manufacturers seem to resist standardization resulting in different interfaces in different vehicles). A touchscreen allows for more controls to be available in a smaller amount of space (i.e., lower cost for more controls, fewer components that could potentially fail, re-using the same space in multiple contexts, etc.). However, to enable more features to be available in a smaller amount of space, infotainment interfaces are often context-driven. Context-driven interfaces result in users looking at the interface to find the controls instead of looking at the road, which results in distracted driving.

To prevent driver distraction from infotainment systems, some manufacturers prevent interaction with the infotainment system while the vehicle is in motion (i.e., a radio station or playlist cannot be changed when the vehicle is not stationary). A trade-off between safety and convenience for the driver is implemented. However, the infotainment system cannot distinguish between input from a driver or input from a passenger. A passenger interacting with the infotainment system is irrelevant to driver distraction (and might even reduce driver distraction by allowing someone else to control the infotainment system while the driver focuses on the road). When an infotainment system disables all control while the vehicle is in motion, even a passenger is unable to provide input, which can be an annoyance for vehicle occupants. Without a way to distinguish between input from a driver and input from a passenger, the infotainment system cannot intelligently enable or disable input.

It would be desirable to implement an infotainment system permission control while driving using in-cabin monitoring.

SUMMARY

The invention concerns an apparatus comprising an interface and a processor. The interface may be configured to receive pixel data of an interior of a vehicle. The processor may be configured to process the pixel data arranged as video frames, perform computer vision operations to detect objects in the video frames, extract characteristics about the objects detected, associate movement of a body part to a particular person in the vehicle based on the characteristics extracted and generate a control signal in response to the movement of the body part of the particular person. A device is configured to operate in a locked mode that prevents input when the vehicle is in motion. The control signal is configured to enable the device to receive the input when the device is in the locked mode. The movement of the body part detected by the processor comprises providing the input to the device. The control signal may be generated only when the particular person associated with the movement of the body part corresponds to an occupant in the vehicle that is not a driver of the vehicle.

BRIEF DESCRIPTION OF THE FIGURES

Embodiments of the invention will be apparent from the following detailed description and the appended claims and drawings.

FIG. 4 is a diagram illustrating an object comparison between a reference video frame and a captured video frame.

DETAILED DESCRIPTION OF THE EMBODIMENTS

Figure 1:
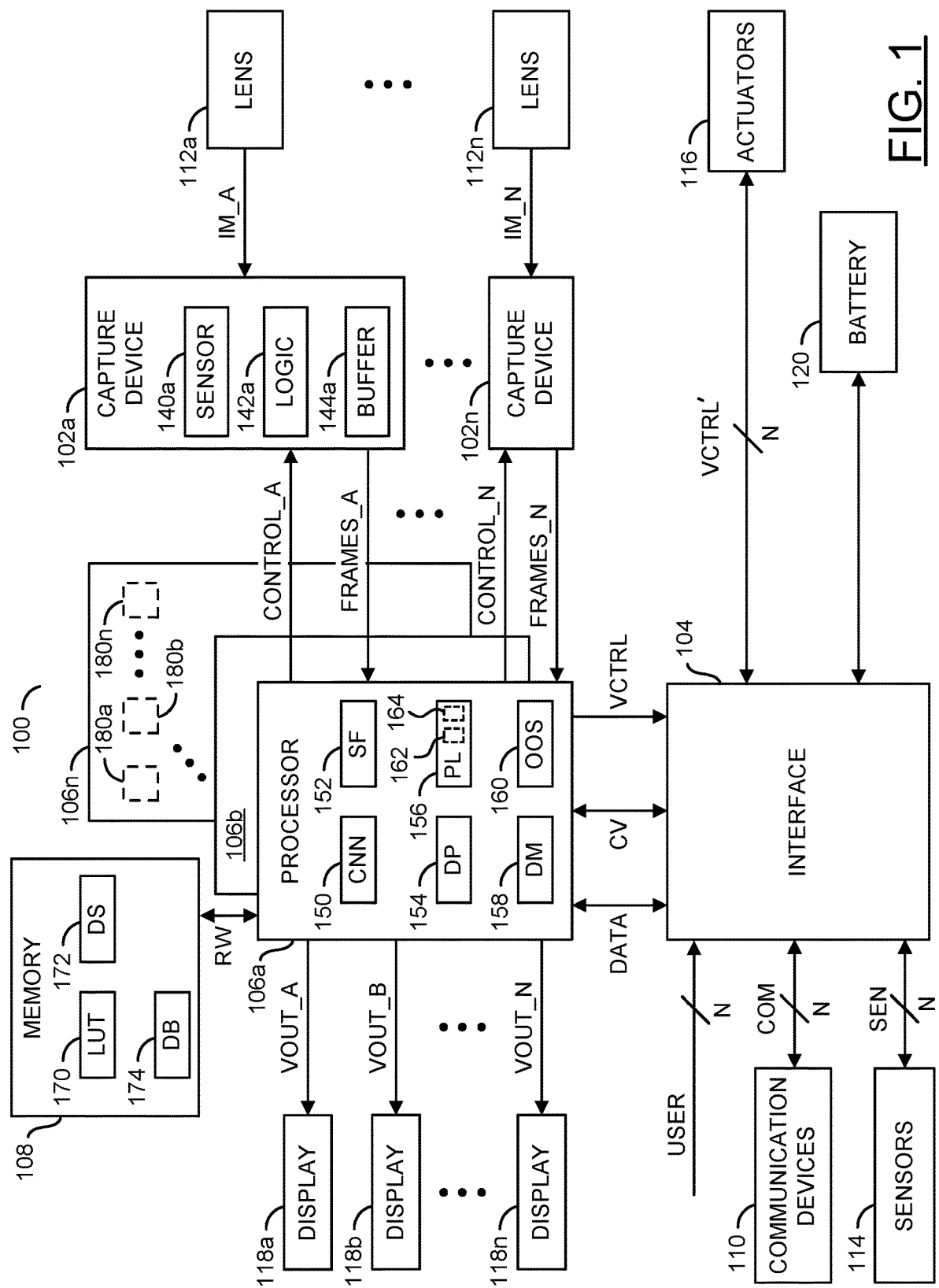
FIG. 1 is a diagram illustrating an embodiment of the present invention.

Embodiments of the present invention include providing an infotainment system permission control while driving that may (i) enhance capabilities of in-cabin monitoring, (ii) distinguish between body parts belonging to different occupants in a vehicle, (iii) override an input lock of an infotainment system, (iv) determine when a passenger provides input to an infotainment system based on video analysis of movement, (v) determine when a driver provides input to an infotainment system based on video analysis of movement, (vi) operate in addition to driver distraction prevention features, (vii) prevent annoyance caused by driver distraction prevention features by providing additional context information, (viii) detect movements of hands and arms of vehicle occupants and/or (ix) be implemented as one or more integrated circuits.

Embodiments of the present invention may be configured to implement in-cabin monitoring. The in-cabin monitoring may enable detecting characteristics, behaviors and/or movements performed by occupants within a vehicle. The in-cabin monitoring may be configured to distinguish between a driver of the vehicle and other occupants (e.g., passengers) of the vehicle. The in-cabin monitoring may be configured to detect movement of arms and hands of each vehicle occupant. For example, the in-cabin monitoring may clearly identify arms and hands of a driver of the vehicle. The movement of the arms and hands of the vehicle occupant may be used to determine the behavior of each occupant. In one example, the movement of the arms and hands may be analyzed to determine whether the vehicle occupant is attempting to provide input to an electronic device (e.g., an infotainment system).

A vehicle infotainment system may be configured to receive input. Generally, the input accepted by an infotainment system may be touch input (e.g., received by a touchscreen interface). The touchscreen interface may not be capable of determining which occupant provided the input (e.g., merely the input is received, without context). The behavior detected by the in-cabin monitoring may be used to provide context about which of the occupants has provided the input to the infotainment system.

To prevent driver distraction, the infotainment system may be configured to operate in a locked mode while the vehicle is moving (e.g., not stationary). While in the locked mode, the infotainment system may disable the touch input. Disabling the touch input may prevent the driver and all other occupants from providing the touch input. Embodiments of the present invention may be configured to enhance the locked mode of the infotainment system using the context information determined from the behavior detected from the in-cabin monitoring. The context information may be used to distinguish which vehicle occupant is attempting to provide the touch input. If the driver is attempting to provide the touch input while the vehicle is moving, then the touch input may be disabled (e.g., to prevent driver distraction). If one of the passengers is attempting to provide the touch input while the vehicle is moving, then the touch input may be enabled (e.g., to add convenience and/or prevent frustration). The touchscreen may be unlocked automatically if the in-cabin monitoring sees the arm of a passenger reaching for the touchscreen, whether the vehicle is stationary or not.

Embodiments, of the present invention may ensure that driver distraction is prevented while enabling convenience features of the infotainment system that do not result in driver distraction. Embodiments of the present invention may add intelligence to the driver distraction prevention features provided by the infotainment system. The intelligence provided may enable the driver distraction prevention features to be narrowly applied to prevent unintended consequences (e.g., ensure driver distraction is prevented while providing a satisfying user experience). For example, computer vision analysis may be implemented to determine context for the input provided such that the driver distraction prevention feature may be limited to be applied when relevant to preventing driver distraction, and not applied when irrelevant to preventing driver distraction.

In some embodiments, the in-cabin monitoring may be configured to detect an identity of a driver. Embodiments of the present invention may operate in a reporting mode (e.g., a nanny mode) based on the driver detected. In an example, if an owner of a vehicle has a teenage child, a notification may be communicated to the owner (e.g., a text message) in response to detecting that the teenage child is driving the vehicle.

Referring to FIG. 1, a diagram illustrating an embodiment of the present invention is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 maybe implemented as many modules, each implementing a different communications standard (e.g., Bluetooth, Wi-Fi, LTE, etc.). In some embodiments, one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, the lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n maybe configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N maybe presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 maybe implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural networks (ANNs) configured to provide artificial intelligence and/or computer vision operations. In an example, the one or more ANNs may comprise a convolutional neural network (CNN) module and/or a generative adversarial network (GAN) trained to provide images processing, object detection, object recognition, object classification, etc. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The processors 106a-106n may comprise an interface configured to receive pixel data, video frames, audio data, sensor data, data from external sources, etc. In an example, the interface of the processors 106a-106n may be configured to enable Gigabit Ethernet, a USB 2.0 host and device, multiple (e.g., three) SD card controllers with SDXC support and/or MIPI-DSI/CSI output. The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a passive infrared (PIR) sensor, a thermometer, a gyroscope, a compass, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. For example, the processors 106a-106n may be configured to receive triple-sensor video input with high-speed SLVS/MIPI-CSI/LVCMOS interfaces. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The ANNs 150 maybe configured to implement various artificial intelligence models. In the example shown, the ANNs 150 may be described as a convolutional neural network module. For simplicity, the ANNs 150 may be described as the CNN module 150. However, other types of artificial intelligence models may be implemented.

The CNN module 150 maybe configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding (e.g., 4KP30 AVC and HEVC encoding with multi-stream support) and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The video pipeline module 156 may enable multi-stream support (e.g., generate multiple bitstreams in parallel, each comprising a different bitrate). In an example, the video pipeline module 156 may implement an image signal processor (ISP) with a 320 MPixels/s input pixel rate. The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 maybe configured to implement a raw image pipeline for image signal processing. The video pipeline module 156 may be configured to convert image data acquired from the capture devices 102a-

102*n*. For example, the image data may be acquired from the image sensor 140*a* in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 maybe configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118*a*-118*n*. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118*a* as the signal VOUT_A. In another example, the decision making module 158 may determine which of the displays 118*a*-118*n* to use to display a notification (e.g., an advertisement) and/or where on the video data to place the notification. In yet another example, the decision making module 158 may adjust output characteristics of the displays 118*a*-118*n* (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102*a*-102*n* may be configured as a stereo pair of cameras. The capture devices 102*a*-102*n* configured as a stereo pair may be implemented close to each other at a pre-defined distance and/or have a symmetrical orientation about a central location. The capture devices 102*a*-102*n* configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106*a*-106*n* may detect feature points of the same object detected in both video frames captured by the capture devices 102*a*-102*n* configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102*a*-102*n* configured as a stereo pair, the disparity engine 164 may be configured to determine a distance. The distance determined by the disparity engine 164 may be the distance from the capture devices 102*a*-102*n* configured as a stereo pair. In an example, the disparity engine 164 may determine a distance from the capture devices 102*a*-102*n* configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemi-spherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n maybe configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. In one example, the hardware modules 180a-180n may be configured to implement various security features (e.g., secure boot, I/O virtualization, etc.). The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
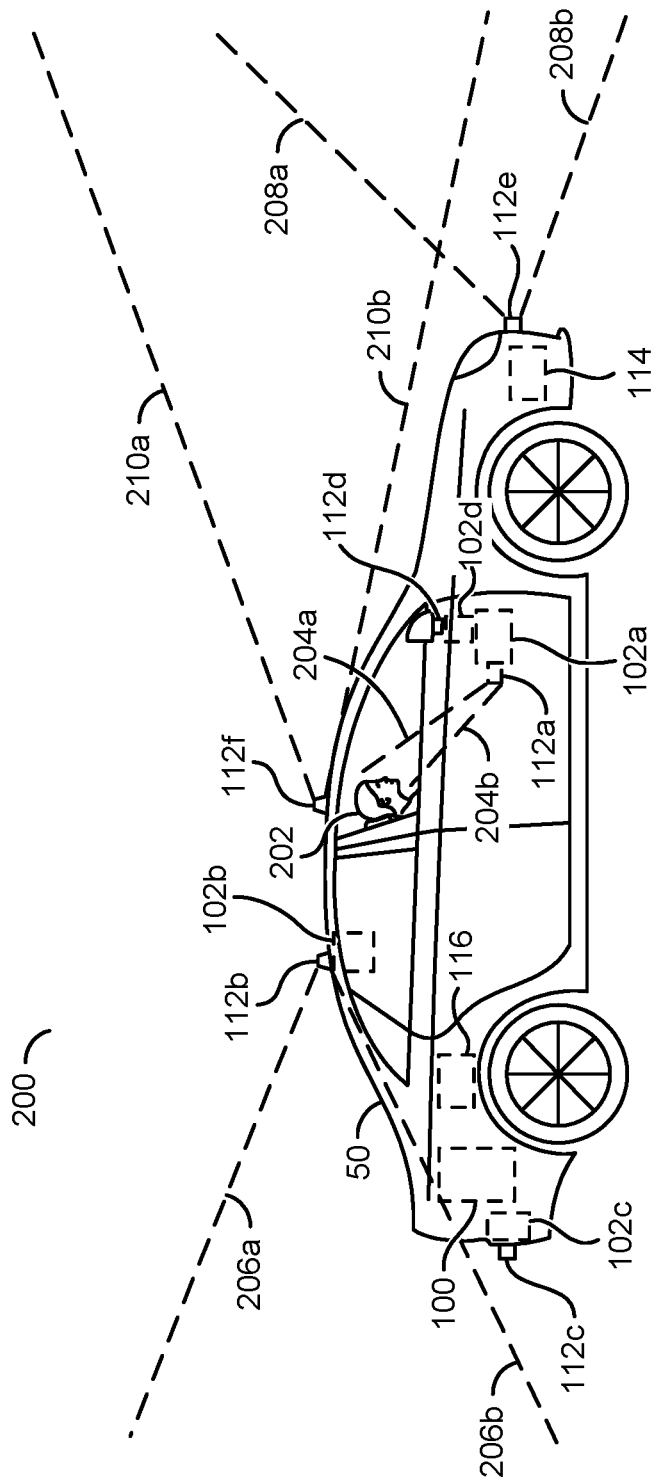
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 1120) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n maybe configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc.

Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations maybe performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented maybe varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics maybe configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n maybe configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
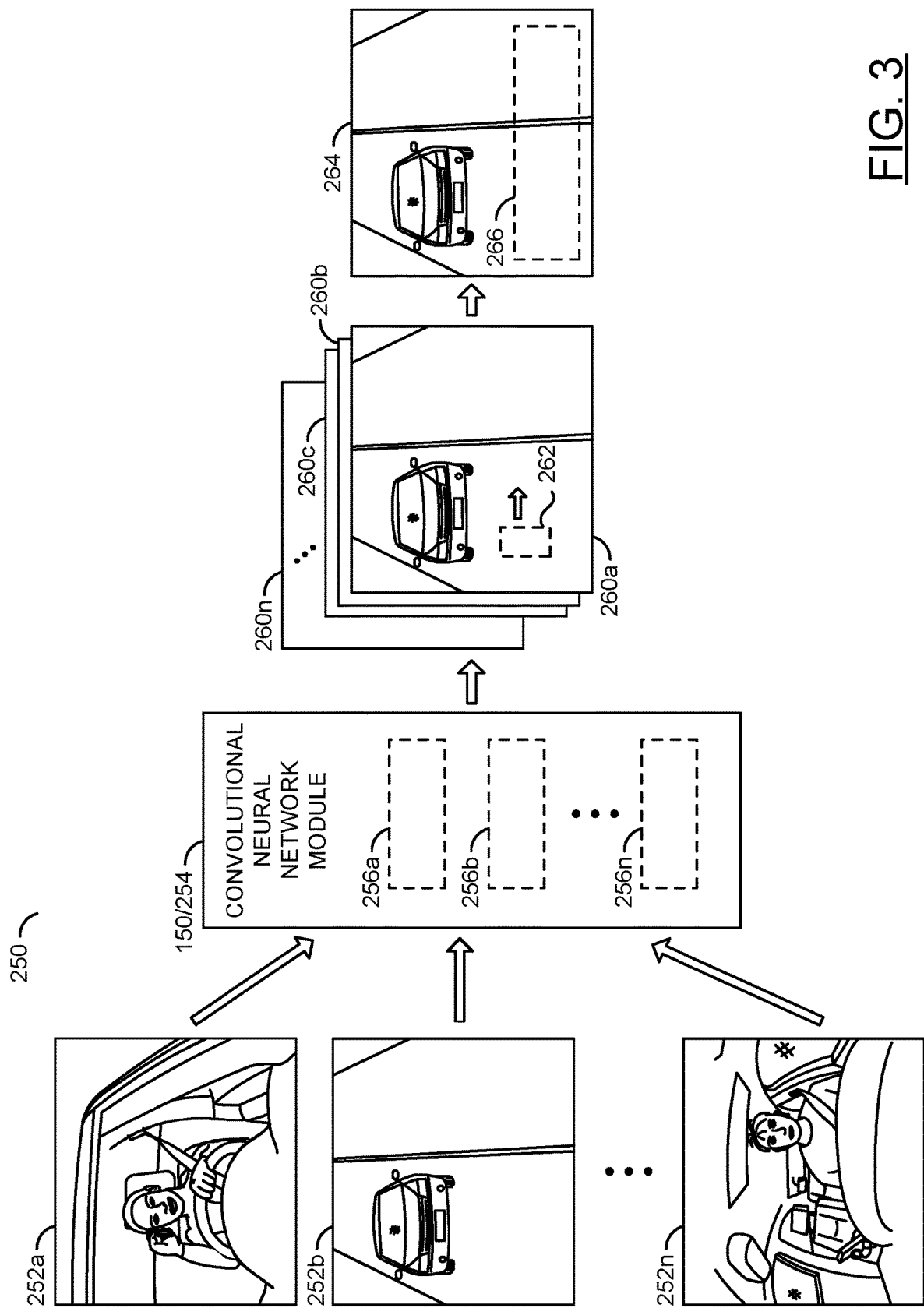
FIG. 3 is a diagram illustrating an example visualization of training a convolutional neural network for object detection using fleet learning.

Referring to FIG. 3, a diagram illustrating an example visualization of training a convolutional neural network for object detection using fleet learning is shown. A training and/or object detection visualization is shown. Images and/or video frames 252a-252n are shown. The images and/or video frames 252a-252n may be training data. The training data 252a-252n may comprise reference images captured from disparate sources. The disparate sources may comprise the video frames FRAMES_A-FRAMES_N processed by the video pipeline module 156 from pixel data and/or video data captured from other sources (e.g., images previously captured by the camera system 100, images received from a database of images (e.g., stock images), images captured by a fleet uploaded to a database of images, etc.). In an example, embodiments of the apparatus 100 may be implemented in a fleet of vehicles (e.g., the ego vehicle 50 and other vehicles may each implement an embodiment of the camera system 100). Each embodiment of the camera system 100 may independently generate video data that may be used as the training data 252a-252n.

To detect objects using computer vision, the convolutional neural network 150 may be trained using the training data 252a-252n. The training data 252a-252n may comprise a large amount of information (e.g., input video frames). For example, multiple vehicles each implementing the camera system 100 may be capable of generating more video data than the camera system 100 installed on the ego vehicle 50 alone. By combining the training data 252a-252n generated from multiple disparate sources (e.g., each implementation of the camera system 100), a greater amount of the training data 252a-252n may be generated and/or a greater variety of the training data 252a-252n may be generated (e.g., video from different types of vehicles, video from different environments, video from different states and/or countries, etc.).

The training data 252a-252n may be labeled. The labels for the training data 252a-252n may be provided as metadata of the video frames. Labeling the training data 252a-252n may enable the CNN module 1250 to have a ground truth basis for determining which objects are present in the training data 252a-252n.

A block (or circuit) 254 is shown. The circuit 254 may implement a computing device, a processor and/or a server computer. The circuit 254 may implement a centralized convolutional neural network. The centralized convolutional neural network 254 may comprise blocks (or circuits) 256a-

256n. The circuits 256a-256n may implement artificial intelligence models. The centralized convolutional neural network 254 may comprise other components (e.g., a processor, a memory, various dedicated hardware modules, a communication device, etc.). The number, type and/or arrangement of the components of the circuit 254 may be varied according to the design criteria of a particular implementation.

The circuit 254 may be configured to receive the training data 252a-252n. For example, each implementation of the camera system 100 (e.g., installed on multiple different vehicles) may be configured to present the training data 252a-252n to the circuit 254. The labels implemented in the metadata of the training data 252a-252n may comprise information about the video content in the video frame. In an example, if the training data 252a comprises an image of a vehicle, the label may indicate that the video frame comprises a vehicle and/or the particular make/model/year of the vehicle. In another example, if the training data 252b comprises an image of a person, the label may indicate an identity of the person (e.g., for facial recognition), characteristics of the person (e.g., age, gender, height, color of clothing, etc.) and/or behavior of the person (e.g., walking, not moving, reaching, sleeping, etc.). The labels of the training data 252a-252n may provide a ground truth sample. In an example, if the artificial intelligence model 256b is configured to detect a driver (or driver behavior), the training data 252a-252n may provide a ground truth sample of a person performing a particular behavior (e.g., driving). The types of information provided by the labels and/or the format of the labels may be varied according to the design criteria of a particular implementation.

The circuit 254 may be configured to train the artificial intelligence models 256a-256n. The circuit 254 may comprise similar functionality as the CNN module 150. The circuit 254 may have access to greater computing resources (e.g., power, processing capabilities, memory, etc.) than the processors 106a-106n. In an example, the circuit 254 may be implemented as part of a cloud computing service, configured to scale resources based on demand. The additional computing capabilities of the circuit 254 maybe capable of handling the large amount of the training data 252a-252n received from the disparate sources.

The AI models 256a-256n may be configured to implement and/or generate a machine readable DAG to detect various objects and/or events. A feature set may be loaded as part of the AI models 256a-256n for analyzing the video frames. The AI models 256a-256n may be continually enhanced in response to the training data 252a-252n. For example, the training data 252a-252n may be used to refine the feature set used to detect objects (e.g., to adjust neural network weight values and/or bias values for the AI models 256a-256n).

The AI models 256a-256n may be generated by the circuit 254 in response to computer vision analysis of the training data 252a-252n. One or more of the AI models 256a-256n may be communicated to the camera system 100. The AI models 256a-256n may be used by the CNN module 150. In an example, the CNN module 150 may implement an AI model, the circuit 254 may receive the training data 252a-252n to refine the AI models 256a-256n, and the CNN module 150 may be updated based on the AI models 256a-256n. Updating the CNN module 150 with one or more of the AI models 256a-256n may enable the CNN module 150 to continually improve the results of the computer vision operations.

The CNN module 150 and the circuit 254 may operate similarly. In some embodiments, the CNN module 150 may receive the training data 252a-252n and update the AI models 256a-256n (e.g., locally). In some embodiments, the circuit 254 may receive the training data 252a-252n and update the AI models 256a-256n for the CNN module 150. For example, the circuit 254 may provide a centralized source for updating the CNN module 150 implemented by multiple implementations of the camera system 100 (e.g., a fleet update). The fleet of vehicles may generate the training data 252a-252n, the circuit 254 may process the training data 252a-252n to update the AI models 256a-256n, and the fleet of vehicles may receive the AI models 256a-256n as an update to the CNN module 150 in order to benefit from the training data 252a-252n generated by the fleet of vehicles. The computer vision operations and/or training performed by the CNN module 150 and the computer vision operations and/or the training performed by the circuit 254 may be implemented similarly. For example, descriptions of operations performed by the circuit 254 may be assumed to apply to the CNN module 150 interchangeably. Similarly, the computer vision operations performed on the training data 252a-252n may be similar to the computer vision operations performed on the video frames FRAMES_A-FRAMES_N generated by the processors 106a-106n.

The artificial intelligence models 256a-256n maybe configured to be trained to detect particular objects. Each of the artificial intelligence models 256a-256n may be trained to recognize, classify and/or distinguish one or more types of objects. The number of artificial intelligence models 256a-256n implemented by the CNN module 150 and/or the circuit 254 may be varied according to the design criteria of a particular implementation.

The CNN module 150 may operate in a training mode of operation. In an example, the AI models 256a-256n may be directed acyclic graphs. In the training mode of operation, the AI models 256a-256n may analyze many examples of objects. In one example, if the AI model 256a is configured to detect vehicles, the AI model 256a analyze many examples of vehicle images. Training the AI models 256a-256n may determine and/or calculate parameters, weighting values and/or biases for the directed acyclic graph. The trained AI models 256a-256n may be a DAG with parameters, weighting values and/or biases pre-programmed and/or pre-defined (e.g., based on self-directed learning) for detecting particular types of objects. In some embodiments, the trained AI models 256a-256n may be a quantized neural network (e.g., a reduced size neural network configured to operate on an edge device that has been modified based on a full size neural network that was trained offline (e.g., on the circuit 254).

While the apparatus 100 is in operation, the CNN module 150 may continually learn using new video frames as the input training data 252a-252n. However, the processors 106a-106n may be pre-trained (e.g., configured to perform computer vision before being installed in the vehicle 50). For example, the results of training data 252a-252n (e.g., the machine learning models 256a-256n) may be pre-programmed and/or loaded into the processors 106a-106n. The processors 106a-106n may conduct inferences against the machine learning models 256a-256n (e.g., to perform object detection). In some embodiments, the signal CV generated by the processors 106a-106n may be sent to the interface 104 to enable the communication devices 110 to upload computer vision information (e.g., to the centralized server 254 and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In the example shown, the training data 252a-252n may capture video data of various vehicle occupants (e.g., captured from one of the capture devices 104a-104n that provides in-cabin monitoring of the ego vehicle 50). For example, the training data 252a-252n may be a sequence of video frames captured prior to the processors 106a-106n determining that a change in orientation of various body parts of an occupant has been detected (e.g., caused by an occupant reaching out, an occupant leaning forward, an occupant moving hands and/or arms, etc.). The training data 252a-252n may be labeled based on whether the prediction was incorrect or correct. Using the training data 252a-252n (e.g., video frames captured from many different vehicles as the vehicles are produced, as different vehicles are deployed on the roads, etc.), many training data sets may be available to train the AI models 256a-256n. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 252a-252n may be uploaded to the central CNN module 254 to perform and/or train the AI models 256a-256n for the computer vision. The results (e.g., the AI models 256a-256n) of the training from the central CNN module 254 may be installed on each of the CNN modules 150 of each apparatus 100 (or transmitted while the apparatus 100 is in operation to remotely provide updates via the communication devices 110).

The CNN module 150 and/or the circuit 254 may receive the training data 252a-252n in a training mode of operation. The CNN module 150 may analyze captured video frames (e.g., the signal FRAMES_A-FRAMES_N) to detect object, classify objects and/or extract data about objects using the trained AI models 256a-256n. To perform the training and/or the computer vision operations, the CNN module 150 may generate a number of layers 260a-260n. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window 262 may slide horizontally one pixel to comprise a box of pixels B0 through E0 and B3 through E3 (e.g., the pixels from B0 through D0 and B3 through D3 are used in both the first and second operation).

The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

Using the input video frames as the training data 252a-252n, the CNN module 150 and/or the AI models 256a-256n may be trained. The training may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the CNN module 150 and/or the AI models 256a-256n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, the machine learning may be performed by the centralized CNN module 254 that has access to greater computing resources than the camera system 100. Generally, the processing capabilities and/or computing resources available to the centralized CNN module 254 (e.g., implemented as part of a cloud computing network) may be greater than the processing capabilities and/or computing resources available to the CNN module 150 implemented by the processors 106a-106n. For example, the centralized CNN module 254 may perform the machine learning using the training data 252a-252n, develop the machine learning models 256a-256n, and then provide the machine learning model 254 to each apparatus 100 in a fleet of vehicles.

Even after the AI models 256a-256n have been trained and/or the CNN module 150 has been deployed, the processors 106a-106n and/or the centralized CNN module 254 may continue to receive the training data 252a-252n from each apparatus 100, refine the machine learning models 256a-256n, and then provide updates to the machine learning model for each apparatus 100 (received using the communication device 110). The centralized CNN module 254 may develop, refine and/or enhance the machine learning models 256a-256n by receiving input (e.g., the training data 252a-252n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning models 256a-256n adapted to the constraints of the edge device. The processors 106a-106n maybe configured to compress the machine learning models 256a-256n (e.g., compressed compared to the machine learning models 256a-256n implemented by the centralized CNN module 254). In an example, compressing the machine learning models 256a-256n may comprise quantization, pruning, sparsification, etc. Compressing the machine learning model may enable the CNN module 150 to perform the machine learning and/or conduct inferences against the machine learning models 256a-256n (e.g., object detection). By performing the machine learning at the edge (e.g., locally on the processors 106a-106n), there may be reduced latency compared to performing wireless communication with the centralized CNN module 254. Similarly, the apparatus 100 may be able to perform the machine learning without maintaining a wireless connection. By performing the machine learning at the edge, privacy may be maintained since the training data 252a-252n would be kept local. Performing the machine learning at the edge (e.g., locally), the processors 106a-106n may preserve privacy and avoid heavy video processing running on back-end servers. Whether the machine learning is performed locally (e.g., at the edge), performed using a centralized resource and/or performed using a combination of local and centralized resources may be varied according to the design criteria of a particular implementation.

The machine learning performed by the CNN module 150 and/or the circuit 254 may comprise supervised training. For example, the CNN module 150 may be self-trained using the training data 252a-252n. Supervised learning may enable the CNN module 150 to automatically adjust the weighting values and/or biases in response to metadata contained within the training data 252a-252n (e.g., a designer and/or engineer may not need to program the weighting values for the AI models 256a-256n). The metadata contained within the training data 252a-252n may provide ground truth data. Backpropagation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more likely to determine the presence of a vehicle. Similarly, where the training data 252a-252n is labeled as not providing an image of a vehicle, the CNN module 150 may extract the features from the image and apply the extracted features to the weighting values to make future computer vision operations more likely to determine the presence of a vehicle (e.g., particular weighting values may be decreased to de-emphasize particular features that may not be associated with a vehicle). The CNN module 150 may implement a deep convolutional neural net to enable features to be learned through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., the reference video frame 300 may be an example of the training data 252a-252n as described in association with FIG. 3). In some embodiments, the reference video frame 300 may be captured when the vehicle 50 is idle and/or turned off In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat in additional rows of seats (e.g., middle seats, a back bench seat, etc.), the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects maybe varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 and a reference object 306 is shown. In the example shown, the reference object 304 may be a driver seat belt and the reference object 306 may be a rear seat. The CNN module 150 may determine a location of the seat belt 304 and/or the rear seat 306 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver). The rear seat 306 may be an example of a static object (e.g., an object that does not move). The rear seat 306 may be used as a static reference to indicate relative movements and/or locations of other objects.

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 150 may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' the detected object 306 and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). Since the rear seat 306 is static, the rear seat 306 may be the same in both the reference video frame 300 and the current video frame 300'. In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
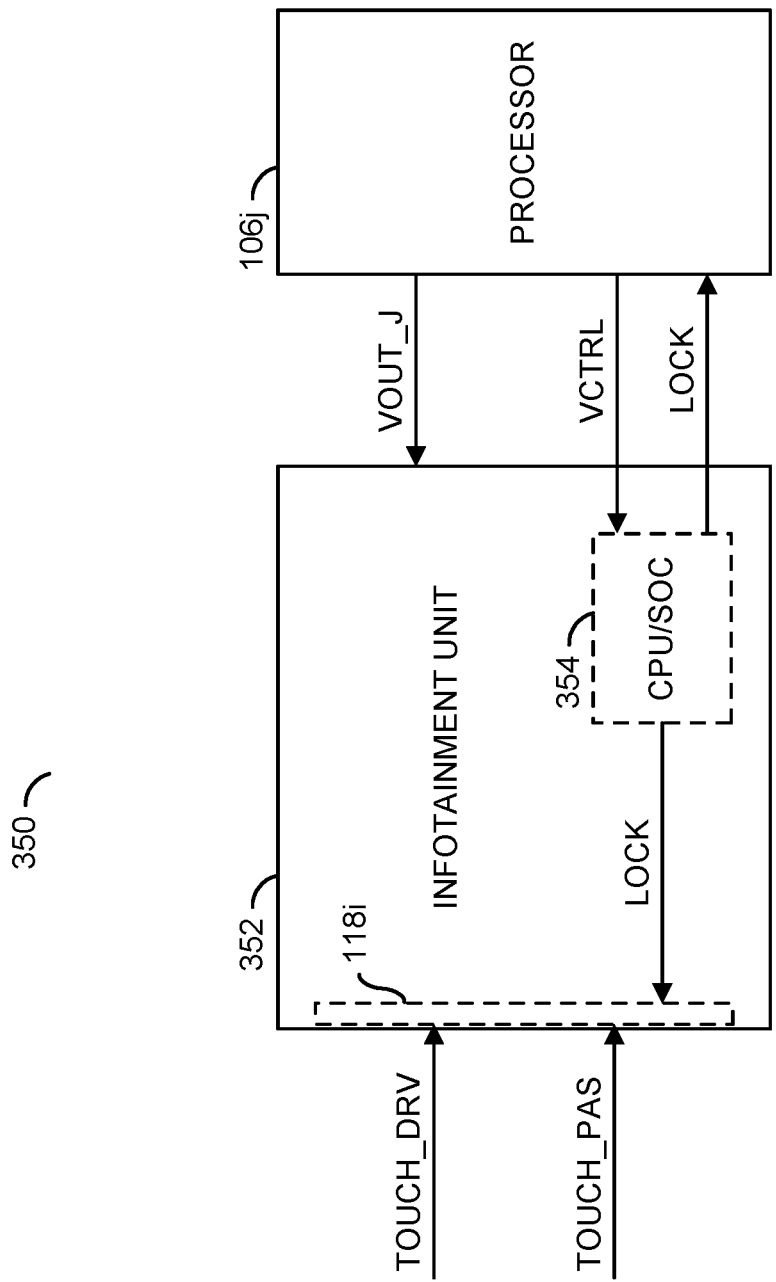
FIG. 5 is a block diagram illustrating generating a control signal for an infotainment unit.

Referring to FIG. 5, a block diagram illustrating generating a control signal for an infotainment unit is shown. A block diagram 350 is shown. The block diagram 350 may comprise the processor 106j and/or a block (or circuit) 352. While only the processor 106j is shown, the processor 106j may be representative of one or more of the processors 106a-106n. The circuit 352 may implement an infotainment unit. The infotainment unit 352 may be a device installed in the ego vehicle 50. In an example, the infotainment unit 352 may be installed as part of a dashboard within the ego vehicle 50.

The infotainment unit 352 may be configured to control various features of the ego vehicle 50. In one example, the infotainment unit 352 may be configured to control atmospheric and/or comfort features (e.g., air conditioning, heating, speed of fans, seat heating, seat location, seat recline, air recirculation, etc.). In another example, the infotainment unit 352 may be configured to control entertainment options (e.g., radio station, connectivity to a smartphone, backseat video options (DVD and/or BluRay player), streaming options, etc.). In yet another example, the infotainment unit 352 may be configured to provide navigation control (e.g., GPS/GNSS, display rear view cameras, blind spot cameras, etc.). The features and/or controls implemented by the infotainment unit 352 may be varied according to the design criteria of a particular implementation.

The infotainment unit 352 may comprise the display 118*i* and/or a block (or circuit) 354. The display 118*i* may implement a touchscreen interface. The circuit 354 may implement a CPU and/or a memory. In an example, the circuit 354 may implement a system on chip (SoC). The infotainment unit 352 may comprise other components (not shown). The number, type and/or arrangement of the components of the infotainment unit 352 may be varied according to the design criteria of a particular implementation.

The CPU 354 may be configured to control the various functionality of the infotainment unit 352. The CPU 354 may be configured to receive and interpret input (e.g., touch commands received from the touchscreen display 118*i*) and/or generate output (e.g., video output to the touchscreen display 118*i* and/or audio). The CPU 354 may be configured to receive input from and/or provide output to the processors 106*a*-106*n*.

The infotainment unit 352 may be configured to receive an input (e.g., TOUCH_DRV) and/or an input (e.g., TOUCH_PAS). The input TOUCH_DRV and the input TOUCH_PAS may be touch input received by the touchscreen display 118*i*. The input TOUCH_DRV may be touch input from the driver 202. The input TOUCH_PAS may be touch input from a passenger (e.g., an occupant of the vehicle 50 other than the driver 202). The infotainment unit 352 may not be able to distinguish between touch input from the driver 202 and touch input from another person (e.g., the touchscreen display 118*i* may merely receive touch input without context).

The CPU 354 is shown generating a signal (e.g., LOCK). The signal LOCK may be communicated to the touchscreen display 118*i*. The signal LOCK may be configured to prevent the touchscreen display 118*i* from receiving the touch input.

The CPU 354 may be configured to change a mode of operation of the infotainment unit 352. In an active mode of operation for the infotainment system 352, the CPU 354 may enable the touch input TOUCH_DRV and TOUCH_PAS. The active mode of operation may be enabled when the ego vehicle 50 is not in motion (e.g., the ego vehicle 50 is stationary). In a locked mode of operation for the infotainment system 352, the CPU 354 may disable the touch input TOUCH_DRV and TOUCH_PAS. The locked mode of operation may be enabled when the ego vehicle 50 is in motion. The locked mode of operation may be set by the CPU 354 to prevent driver distraction. For example, the infotainment unit 352 may be a potential source of distraction for the driver 202 if the driver 202 attempts to operate the infotainment unit 352 when the ego vehicle 50 is moving (e.g., the driver 202 should be paying attention to the road, not the infotainment unit 352). In the example shown, the CPU 354 may present the signal LOCK to prevent the touchscreen display 118*i* from receiving the touch input TOUCH_PAS and/or the signal TOUCH_DRV. In some embodiments, the CPU 354 may not generate the signal LOCK and instead ignore the signal TOUCH_PAS and/or the signal TOUCH_DRV when operating in the locked mode of operation. Since the touch input received by the infotainment unit 352 may not provide context, when the infotainment unit 352 is in the locked mode of operation, the CPU 354 may not accept the touch input from the driver 202 or any of the passengers of the ego vehicle 50.

The infotainment unit 352 may receive the signal VOUT J. The signal VOUT J may comprise video data generated by the processors 106*a*-106*n*. For example, the infotainment unit 352 may be configured to display video received from the processors 106*a*-106*n* (e.g., the touchscreen display 118*i* may display video captured by the rear view capture device 102*c*).

The processors 106*a*-106*n* may be configured to perform computer vision operations on the video frames captured to determine which person is providing input to the infotainment unit 352. In an example, the CNN module 150 may be configured to detect movements of body parts of the various occupants of the ego vehicle 50 to determine who is attempting to touch the touchscreen display 118*i*. The CNN module 150 may be configured to distinguish body parts from one occupant from the body parts of another occupant. The processors 106*a*-106*n* may be configured to determine whether the driver 202 is attempting to provide the touch input TOUCH_DRV or whether another occupant is attempting to provide the touch input TOUCH_PAS. The computer vision operations performed by the processors 106*a*-106*n* may be configured to provide context to the touch input received by the infotainment unit 352 (e.g., context that would not be available from the touch input TOUCH_DRV or TOUCH_PAS alone). For example, without the context provided by the computer vision operations, the infotainment unit 352 may merely sense that touch input was provided. However, with the context provided by the computer vision operations, the infotainment unit 352 may have sufficient information to detect the touch input as either the touch input TOUCH_DRV from the driver 202 or the touch input TOUCH_PAS from another occupant of the ego vehicle 50.

The processors 106*a*-106*n* may present the control signal VCTRL to the CPU 354. The signal VCTRL may be generated in response to one of the passengers (e.g., not the driver 202) of the ego vehicle 50 providing the touch input TOUCH_PAS. The control signal VCTRL may be configured to over-ride the locked mode of operation. For example, the control signal VCTRL may enable the CPU 354 to accept to the signal TOUCH_PAS even when the infotainment unit 352 is in the locked mode of operation. The processors 106*a*-106*n* may not generate the signal VCTRL to over-ride the locked mode of operation when the touch input is determined to be from the driver 202 (e.g., the touch input TOUCH_DRV).

In some embodiments, the processors 106*a*-106*n* may determine which occupant is attempting to provide the touch input at all times (e.g., regardless of whether the infotainment unit 352 is operating in the locked mode of operation). In some embodiments, the CPU 354 may present the signal LOCK to the processors 106*a*-106*n*. The signal LOCK may enable the processors 106*a*-106*n* to determine when the infotainment unit 352 is in the locked mode of operation. In response to the signal LOCK, the processors 106a-106n may perform the computer vision operations to determine which occupant is attempting to provide input to the infotainment unit 352 (e.g., the processors 106a-106n may not determine who is providing touch input when the infotainment unit 352 is in the active mode of operation).

Figure 6:
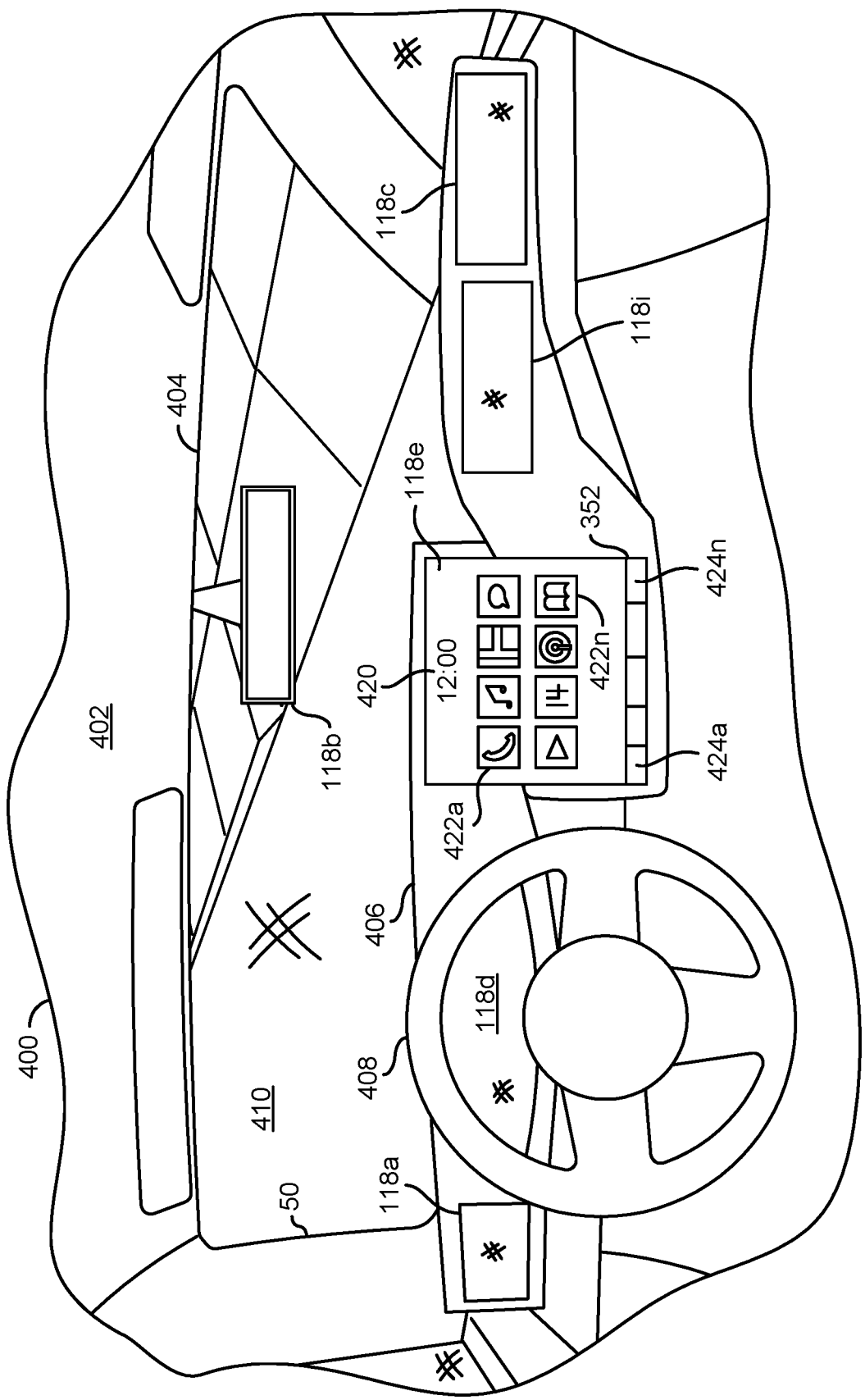
FIG. 6 is a diagram illustrating an ego vehicle infotainment system.

Referring to FIG. 6, a diagram illustrating an ego vehicle infotainment system is shown. A perspective 400 is shown. The perspective 400 may be a representation of a view of an interior 402 of the ego vehicle 50. The perspective 400 may generally provide a view of the interior 402 from the location and direction of the driver 202 but may not be what the driver 202 would actually see (e.g., may not be representative of a gaze direction).

The interior 402 of the ego vehicle 50 may comprise a windshield 404, a dashboard 406 and/or a steering wheel 408. A number of the displays 118a-118n are shown. In the example shown, the displays 118a-118i are shown throughout the interior 402. However, the number of the displays 118a-118n available in the ego vehicle 50 may be varied according to the design criteria of a particular implementation.

A road 410 is shown as part of the view through the windshield 404. For example, the ego vehicle 50 may be driving in a forward direction on the road 410.

In the example shown, the display 118a may be located on the dashboard 406 to the left of the steering wheel 408. For example, the display 118a may be configured to display video data corresponding to the rear view from the driver side (e.g., emulating a driver side reflective mirror). In the example shown, the display 118b may be located at the top of the windshield 404. For example, the display 118b may be configured to display video data corresponding to the rear view (e.g., emulating a traditional reflective rearview mirror). In the example shown, the display 118c may be located on the dashboard 406 to the far right of the interior 402. For example, the display 118c may be configured to display video data corresponding to the rear view from the passenger side (e.g., emulating a passenger side reflective mirror).

The display 118d maybe located on the dashboard 406 behind the steering wheel 408, and the displays 118e-118i may be located on the dashboard 406 at various locations to the right of the steering wheel 408. In one example, one or more of the displays 118d-118i may be configured to display vehicle information (e.g., warning icons, speed, distance, temperature, odometer, etc.). In the example shown, the display 118e may be configured as the infotainment touchscreen display (e.g., providing a user interface for audio, navigation, hands-free phone communication, etc.) for the infotainment unit 352.

The processors 106a-106n may be configured to communicate any of the signals VOUT_A-VOUT_N to any of the displays 118a-118i. In an example, the user interface of the infotainment touchscreen (e.g., the display 118e) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

The display 118e for the infotainment unit 352 is shown as a large screen generally centered on the dashboard 406. The display 118e is shown displaying a time 420 and apps 422a-422n. The infotainment unit 352 may further comprise physical buttons 424a-424n. In some embodiments, the touchscreen display 118e may provide a video output comprising the video data captured by the capture devices 102a-102n and/or additional information generated by the processors 106a-106n that may be shown to the driver 202. In an example, the video output for the display 118e of the infotainment unit 352 may be a lower angle view than the view through the windshield 404 (e.g., the video output may be captured by the lens 112e mounted to the front bumper of the ego vehicle 50). In some modes of operations, the touchscreen display 118e may be configured to display various options for the ego vehicle 50. The video output displayed by the touchscreen display 118e may be varied according to the design criteria of a particular implementation.

The time display 420 may provide the current time. The driver 202 and/or a passenger may interact with the touchscreen display 118e to set the time display 420 (or the infotainment unit 352 may be configured to communicate to a third party service for synchronizing the time). The apps 422a-422n are shown as various icon buttons. In an example, the app 422a may comprise a hands-free phone app (e.g., for communicating using a connected smartphone), the app 422b may comprise a music app (e.g., a streaming service, playing from a local physical medium, a radio app, etc.), the app 422c may comprise a navigation app (e.g., a GPS/GNSS map, a third-party map service, etc.), the app 422d may comprise a hands-free texting app (e.g., text-to-speech reading of incoming text and speech-to-text for outgoing texts), the app 422e may play one of the video streams VOUT_A-VOUT_N, the app 422f may comprise a vehicle settings app (e.g., control air conditioning, control fan speeds, control windows, control seat position, etc.), the app 422g may comprise connection settings (e.g., to set up a Bluetooth connection to a smartphone). Other apps 422a-422n may be implemented. The apps 422a-422n may be implemented to aid the driver 202 (e.g., implement driver assistance features). The apps 422a-422n may be implemented to reduce boredom and/or frustration while driving (e.g., provide entertainment). While the apps 422a-422n may assist the driver 202 in some circumstances, the apps 422a-422n may also be source of distraction to the driver 202. For example, interacting with the apps 422a-422n while the driver 202 is driving may be a source of distraction for the driver 202 (e.g., the driver 202 may look at the touchscreen display 118e to interact with the apps 422a-422n instead of looking at the road 410).

The driver 202 and/or a passenger may interact with the infotainment unit 352 using the touchscreen display 118e and/or using the physical buttons 424a-424n. The touch input TOUCH_DRV and/or the touch input TOUCH_PAS may provide input to the CPU 354 similar to the physical buttons 424a-424n. The physical buttons 424a-424n may provide hard-wired controls to the infotainment unit 352.

When the CPU 354 sets the infotainment unit 352 to the active mode of operation, the touch input provided to the touchscreen display 118e and/or input provided using the buttons 424a-424n may be enabled. In one example, the CPU 354 may accept any input (e.g., the touch input TOUCH_DRV, the touch input TOUCH_PAS and/or the physical buttons 424a-424n). In another example, the physical buttons 424a-424n may be pressable and/or the touchscreen display 118e may be responsive. The infotainment unit 352 may be set to the active mode of operation when the ego vehicle 50 is not motion (e.g., while the ego vehicle 50 is idling).

When the CPU 354 sets the infotainment unit 352 to the locked mode of operation, the touch input provided to the touchscreen display 118e and/or input provided using the buttons 424a-424n may be disabled. In one example, the CPU 354 may ignore any input. In another example, the physical buttons 424a-424n may be locked and/or the touchscreen display 118e may be non-responsive to input. The infotainment unit 352 may be set to the locked mode of operation when the ego vehicle 50 is in motion (e.g., while the driver 202 is driving the ego vehicle 50 on the road 410).

During the locked mode of operation, the processors 106a-106n may perform the computer vision operations on the video frames captured of the vehicle interior 402. The processors 106a-106n may determine which occupant is providing the input (e.g., which occupant is touching the touchscreen display 118e and/or which occupant is pressing the physical buttons 424a-424n). If the driver 202 is attempting to interact with the touchscreen display 118e and/or the physical buttons 424a-424n, the input may be ignored. If an occupant other than the driver 202 is attempting to interact with the touchscreen display 118e and/or the physical buttons 424a-424n, the processors 106a-106n may communicate the signal VCTRL enable the CPU 354 to accept the input.

In some embodiments, the in-cabin monitoring performed by the processors 106a-106n may be capable of capturing video frames of the driver 202 or another occupant touching the infotainment unit 352 (e.g., one or more of the lenses 112a-112n provides a view of the touchscreen 118e of the infotainment unit 352). The computer vision operations may detect the person as the person touches the infotainment unit 352 and determine whether the person is the driver 202 (e.g., for example, when the video frame captured is similar to the view 400 shown). In some embodiments, the in-cabin monitoring performed by the processors 106a-106n may not directly capture video frames of the touchscreen 118e of the infotainment unit 352. If the touchscreen 118e of the infotainment unit 352 is not directly visible, the processors 106a-106n may be configured to infer which occupant is providing the touch input by analyzing each occupant with respect to the location of the infotainment unit 352 (as described in association with FIG. 7).

Figure 7:
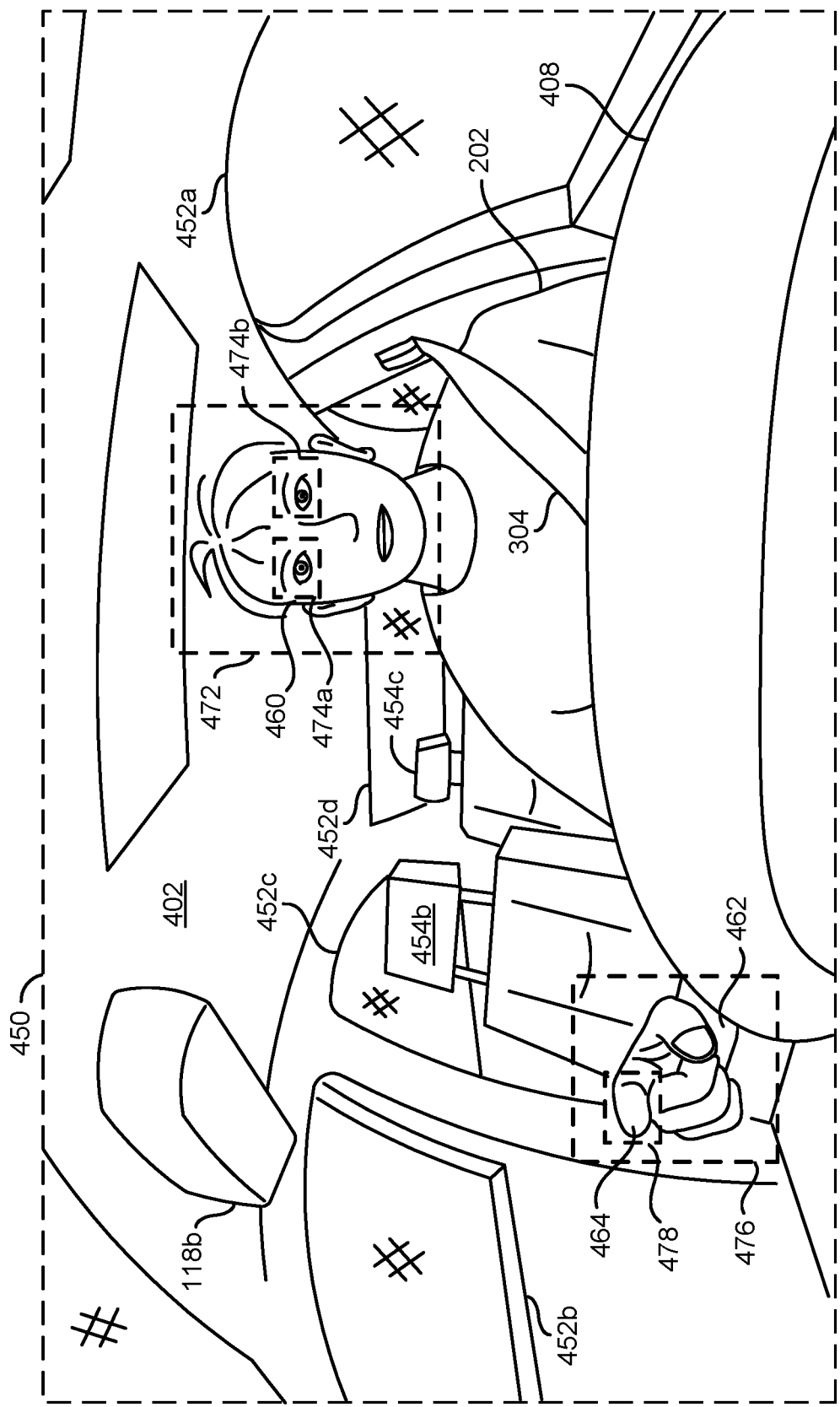
FIG. 7 is a diagram illustrating computer vision operations performed on an example portion of a video frame to detect body parts and use of an infotainment unit by a driver.

Referring to FIG. 7, a diagram illustrating computer vision operations performed on an example portion of a video frame to detect body parts and use of an infotainment unit by a driver is shown. An example video frame 450 is shown. In one example, the example video frame 450 may be a portion (e.g., a subset) of a full video frame captured by one of the capture devices 102a-102n. The processors 106a-106n may be configured to generate video data from the video frames FRAMES_A-FRAMES_N that have a sufficiently high resolution that portions of the video frame may have enough detail for computer vision operations to be performed. In an example, digital zooming, dewarping, oversampling and/or cropping may be performed on a full video frame to generate a video frame portion. In another example, the computer vision operations may be performed on a targeted subset of the full video frame. For example, if the full video frame is a 4K resolution video frame, the video frame portion may have sufficient detail for the CNN module 150 to detect objects. The method of generating the video frame 450 (or a portion of the video frame) may be varied according to the design criteria of a particular implementation.

The example video frame 450 may provide an image of the interior 402 of the ego vehicle 50. The example video frame 450 may comprise an example of in-cabin monitoring performed by the camera system 100. The processors 106a-106n may be designed with dedicated hardware modules configured to efficiently generate high resolution video frames in real-time and perform the computer vision operations in real-time. The driver 202 is shown within the interior 402. The driver 202 is shown alone in the interior 402 (e.g., no passengers are present).

The vehicle interior 402 shown in the example video frame 450 may comprise the display 118b (e.g., the display configured as a rearview mirror), the seatbelt 304, the steering wheel 408, doors/windows 452a-452d and/or seats 454b-454c. In the example shown, the door/window 452a may be a driver side door/window, the door/window 452b may be a passenger side door/window, the door/window 452c may be a rear passenger door/window, and the door/window 452d may be the rear window (or the trunk). In the example video frame 450, the seat 454b may be the passenger seat and the seat 454c may be the rear passenger seat. In the perspective of the example video frame 450, the driver seat (e.g., the seat 454a) may not be visible (e.g., obscured by the driver 202). In some embodiments, a rearview mirror implementing a reflective mirror may be implemented instead of the electronic mirror 118b. In the example shown, the seatbelt 304 may be the driver seat belt. Each of the steering wheel 408, the doors/windows 452a-452d, the display 118b, the seats 454b-454c and/or the seatbelt 304 may be examples of objects that may be detected by the CNN module 150. The CNN module 150 may be configured to detect and/or recognize other types of objects (e.g., other seatbelts (not shown), the seat 454a (not shown), a vehicle pillar, items stored in the vehicle (e.g., blankets, groceries, ice scrapers, other personal belongings, etc.) within the interior 402, other occupants, etc.

The driver 202 is shown in the video frame 450. A head/face 460, an arm 462 and a hand 464 of the driver 202 are shown. The head 460, the arm 462 and the hand 464 may comprise body parts of the driver 202. The CNN module 150 may be configured to detect the body parts of the driver 202 and/or other occupants in the interior 402 of the ego vehicle 50. The CNN module 150 may be configured to detect the head 460, the arm 462 and/or the hand 464. The CNN module 150 may be configured to detect other body parts (e.g., a chest, a torso, shoulders, individual fingers, legs, etc.). The types of body parts detected and/or the granularity (e.g., detecting a hand compared to detecting a palm and individual fingers) of the body parts detected by the CNN module 150 may be varied according to the design criteria of a particular implementation.

In the perspective of the example video frame 450, the infotainment unit 352 may not be visible. Generally, interacting with the infotainment unit 352 may cause the driver 202 to be distracted. Using the infotainment unit 352 (e.g., interacting with the infotainment unit 352, looking at the infotainment unit 352, etc.) may cause the driver 202 to not pay attention (or not pay full attention) to driving (e.g., the driver 202 may look away from the road 410). Since the infotainment unit 352 may not be visible in the example video frame 450, the processors 106a-106n may be configured to infer interaction with the infotainment unit 352 based on the movement of the body parts of the driver 202.

A dotted box 472, dotted boxes 474a-474b, a dotted box 476 and a dotted box 478 are shown. The dotted boxes 472-478 may represent the computer vision operations performed by the processors 106a-106n to detect the body parts and/or behavior of the occupants of the ego vehicle 50. The CNN module 150 may be configured to detect features and/or descriptors in the example video frame 450 and compare the features and/or descriptors against the features and/or descriptors learned from the training data 252a-252n in order to recognize the pixels of the video frame 500 that correspond to the body parts of the occupants. While only the driver 202 is shown in the example video frame 450, the processors 106a-106n may be configured to detect body parts and/or behavior for each occupant in the interior 402.

The dotted boxes 472-478 may comprise the pixel data corresponding to an object detected by the computer vision operations pipeline 162 and/or the CNN module 150. The dotted boxes 472-478 are shown for illustrative purposes. In an example, the dotted boxes 472-478 may be a visual representation of the object detection (e.g., the dotted boxes 472-478 may not appear on an output video frame displayed on one of the displays 118a-118n). In another example, the dotted boxes 472-478 may be a bounding box generated by the processors 106a-106n displayed on the video frame to indicate that an object has been detected (e.g., the bounding boxes 472-478 may be displayed in a debug mode of operation). The number and/or types of objects detected by the processors 106a-106n may be varied according to the design criteria of a particular implementation.

The bounding box 472 may correspond to the head/face 460 of the driver 202. The bounding boxes 474a-474b may correspond to eyes of the driver 202. The eyes 474a-474b may be detected as a sub-portion of the detected face 472 (e.g., the processors 106a-106n may limit the search region for detecting the eyes 474a-474b to the region of the video frame 450 that corresponds to the detected face 472). The bounding box 476 may correspond to the arm 462 and/or the hand of the driver 202. The bounding box 478 may correspond to the finger 464 of the driver 202. The detected finger 478 may be detected as a sub-portion of the detected hand 476 (e.g., the detected finger 478 may represent a higher granularity of detection than merely detecting the detected arm 476).

The processors 106a-106n may be configured to determine whether the driver 202 is attempting to use the infotainment unit 352. To determine the attempted use of the infotainment unit 352, the processors 106a-106n may be configured to detect the body parts of the driver 202 and/or determine movement of the body parts of the driver 202. The processors 106a-106n may determine and/or infer whether the driver 202 is interacting with the infotainment unit 352 by performing and making determinations based on input received by the infotainment unit 352, the face detection 472, the eyes detection 474a-474b, the arm detection 476 and/or the finger detection 478. The processors 106a-106n may combine the results from analyzing the face detection 472, the eyes detection 474a-474b, the arm detection 476 and/or the finger detection 478 to make inferences that may not be possible by analyzing the input to the infotainment unit 352, the face detection 472, the eyes detection 474a-474b, the arm detection 476 and/or the finger detection 478 alone. For example, merely detecting receiving input from the infotainment unit 352 may not provide sufficient evidence of use by the driver 202 (e.g., if other occupants are in the ego vehicle 50).

In the example shown, since the driver 202 is alone, any input provided to the infotainment unit 352 may be assumed to be from the driver 202. For example, when the processors 106a-106n detect no other occupants in the ego vehicle 50 than the driver 202, then all input to the infotainment unit 352 may be assumed to be by the driver 202 and the input may be ignored when the infotainment unit 352 is in the locked mode of operation. If other occupants are detected in the ego vehicle 50, then the processors 106a-106n may perform additional computer vision operations to detect the body parts and/or determine the behavior of each occupant to determine which occupant is attempting to provide input to the infotainment unit 352.

The decision module 158 may weigh multiple factors to make a determination about the behavior of the occupants of the ego vehicle 50. The determination may be provided as a confidence level. The confidence level may provide a numerical and/or computer readable representation of how likely the result of the determination is correct. For example, if the decision module 158 determines that there is interaction with the infotainment unit 352 with a confidence level that is greater than a threshold level, then the processors 106a-106n may not generate the signal VCTRL (e.g., to enable input to the infotainment unit 352). The threshold level may be a pre-defined and/or programmable value.

The processors 106a-106n may analyze each of the body parts of the driver 202. The processors 106a-106n may analyze the head/face detection 472. In the example shown, the processors 106a-106n may detect the face 460 of the driver 202. The processors 106a-106n may determine a location of the occupants within the interior 402. In one example, the processors 106a-106n may use the location of the face detection 472 to determine the location of the occupants (e.g., each occupant is likely to be located in an area of the interior 402 where the corresponding face 472 is located). The location of the occupants maybe used to determine which occupant is the driver 202 and which occupants are passengers (e.g., in a scenario that has multiple occupants). The location of the driver 202 and/or each of the passengers may be used to determine which body parts belong to which occupant.

The processors 106a-106n may further analyze the head/face detection 472 to determine the behavior of the driver 202 (e.g., determine whether the driver 202 is attempting to provide input to the infotainment unit 352). The processors 106a-106n may analyze the direction of the head/face 472. In the example shown, the head/face 472 is shown facing straight ahead (e.g., towards the windshield 404). When the head/face 472 is directed straight ahead, the confidence level for interaction with the infotainment unit may be decreased. In an example, if the head/face 472 is determined to not be facing the windshield 404 (e.g., the head/face 472 is turned towards the location of the infotainment unit 352), then the confidence level for input from the driver 202 may be increased.

The processors 106a-106n may be configured to analyze the eyes 474a-474b to determine the behavior of the driver 202. The processors 106a-106n may be configured to determine the direction of the eyes 474a-474b. For example, the driver 202 may attempt to hide the attempt to provide input by keeping the head/face 472 straight ahead, but look at the infotainment unit 352 by moving the eyes 474a-474b to look towards the infotainment unit 352 (e.g., and look away from the road 410). In the example shown, the infotainment unit 352 may be located near the center of the dashboard 406 as shown in association with FIG. 6. The processors 106a-106n may have prior knowledge of the location of the infotainment unit 352 (e.g., the eyes 474a-474b may be directed down and to the left of the steering wheel 408 when the driver 202 is looking at the infotainment unit 352). For example, the location of the infotainment unit 352 within the ego vehicle 50 may be stored as part of the data storage 172. In the example shown, the eyes 474a-474b may be directed straight ahead (e.g., towards the windshield 404 and not directed towards the location of the infotainment unit 352), which may decrease the confidence level of detection of input by the driver 202. In another example, if the eyes 474a-474b were directed towards the location of the infotainment unit 352, then the decision module 158 may increase the confidence level of detection of input by the driver 202. Details of determining the gaze of the driver 202 may be described in association with U.S. application Ser. No. 16/413,974, filed on May 16, 2019, appropriate portions of which are incorporated by reference.

The processors 106a-106n may analyze the detected arm 476 and/or the detected finger 478 to determine the behavior of the driver 202. The processors 106a-106n maybe configured to determine the movement of the detected arm 476. In an example, the processors 106a-106n may analyze a sequence of video frames (e.g., the example video frame 450 and a number of video frames that were captured before and after the example video frame 450). Analyzing the sequence of video frames may enable the decision module 158 to determine locations of the detected arm 476 and/or the detected finger 478 over time. The locations determined over time may enable the processors 106a-106n to predict and/or determine the movement of the detected arm 476 and/or the detected finger 478. In one example, when the detected arm 476 is moving towards the location of the infotainment unit 352, the driver 202 may be more likely to be attempting to interact with the infotainment unit 352. If the detected arm 476 of the driver 202 is determined not to be reaching towards the infotainment unit 352, then the driver 202 may be unlikely to be interacting with the infotainment unit. In another example, if the detected finger 478 is extended, the processors 106a-106n may determine that the driver 202 is attempting to touch the touchscreen display 118i of the infotainment unit 352 and/or the physical buttons 424a-424n. If the detected finger 478 is not extended, the processors 106a-106n may determine that the driver 202 is not attempting to interact with the infotainment unit 352. The decision module 158 may increase or decrease the confidence level about the driver 202 (e.g., whether or not the driver 202 is attempting to interact with the infotainment unit 352) based on the various factors detected in response to analyzing the movements of multiple body parts.

In the example shown, the arm 462 may not be visibly connected to the body of the driver 202 (e.g., partially blocked by the steering wheel 408). The processors 106a-106n may determine how likely that the arm 462 is the arm of the driver 202 (e.g., the more likely that the arm 462 belongs to the driver 202, the more the confidence level may be increased). The detected arm 476 and/or the detected finger 478 may be more likely to be associated with the driver 202 based on the proximity to other body parts of the driver 202. For example, the shoulder of the driver 202 may be determined to be extending, which may be an indication that the driver 202 is reaching out and increase the likelihood that the detected arm 476 belongs to the driver 202.

The processors 106a-106n may determine whether the driver 202 is attempting to provide input to the infotainment unit 352 by searching for the detected arm 476 and/or the detected finger 478. If the detected arm 476 and/or the detected finger 478 are not in a sub-region of pixels that correspond to the location of the infotainment unit 352 (e.g., the bottom left of the example video frame 450 in the example shown), then the processors 106a-106n may decrease the confidence level for the driver 202 providing input. In some embodiments, the computer vision operations may be limited to particular sub-regions of the video frames. Limiting the search for the detected arm 476 and/or the detected finger 478 to the sub-region of the location of the infotainment unit 352 may efficiently utilize the resources of the processors 106a-106n (e.g., determining that the detected finger 478 is extended may be irrelevant for input to the infotainment unit 352 if the detected finger 478 is extended towards another button such as a power window button located near the window 452a, so searching elsewhere in the video frame portion 450 may not be performed). Generally, the computer vision operations may be performed near the location of the infotainment unit 352 and the location of each of the occupants of the ego vehicle 50 (e.g., to determine which occupant the detected arm 476 and/or the detected finger 478 belongs to).

Each factor analyzed for the behavior and/or movement of the driver 202 (e.g., the detected face 472, determining the direction of the detected eyes 474a-474b, determining that the detected arm 476 is reaching out, determining that the detected finger 478 is extended and/or other factors) may be weighted independently and/or together to generate the confidence level of input to the infotainment unit 352 by a particular one of the vehicle occupants. Each factor may have a different amount of weighting applied to the final confidence level score. The amount that each factor applies to the final confidence level score may be varied according to the design criteria of a particular implementation.

The processors 106a-106n may analyze multiple video frames in a sequence of captured video frames to capture both the driver 202 and/or other occupants in the same video frame and/or to capture evidence of input provided to the infotainment unit 352 shown over multiple video frames (e.g., the driver 202 may look toward the infotainment unit 352 in a first video frame before reaching out, then in a subsequent video frame look back towards the road 410 while reaching out with the arm 462 to touch the infotainment unit 352). In some embodiments, the processors 106a-106n may be configured to determine a direction of a gaze of the eyes 474a-474b. The direction of the gaze and/or the length of time that the gaze is directed at a particular object may be used to distinguish between the driver 202 looking at the infotainment unit 352 or looking at something else.

In the example shown, the detected arm 476 and the detected head 472 may be detected in the same video frame 450. In some scenarios, one video frame may not capture both the head 460 and the arm 462. The processors 106a-106n may be configured to analyze multiple different video frames that maybe captured by more than one of the capture devices 102a-102n. For example, one video frame may capture the arm 462 and another video frame may capture the head 460 (e.g., multiple video frames captured from different perspectives). The processors 106a-106n may be configured to analyze both video frames and make inferences based on the computer vision operations performed on both the video frames. Feature markers of the detected head 472 extracted from multiple video frames may be compared to determine whether the detected head 472 corresponds to the same person (e.g., the driver 202). Inferences may be made about the same person based on the video frames captured from multiple perspectives.

Metadata may be applied to each video frame captured. The metadata may comprise information about the objects detected, the features extracted, the movement determined and/or the behaviors determined. In an example, metadata applied to the example video frame 450 may comprise information detected using the computer vision operations (e.g., the detected head 472 is looking towards the road 410, the detected arm 462 is reaching towards the infotainment unit 352, the detected finger 478 is extended, the driver 202 is alone, etc.). The decision module 158 may use the metadata applied to multiple video frames to determine the behavior of the driver 202. In an example, in a first video frame, the metadata may provide one set of information (e.g., the driver 202 is looking at the road 410, the detected arm 476 is holding the steering wheel), and a next video frame may comprise metadata that provides another set of information (e.g., the driver 202 is looking at the road 410, the detected finger 478 is extended, the detected arm 476 is near the detected face 472) and the decision module 158 may analyze the metadata from the multiple video frames to make a determination (e.g., the driver 202 is paying attention to the road 410, the finger 464 is extended to scratch the face 460, and the driver 202 is not providing input to the infotainment unit 352).

In the example video frame 450, the driver 202 is shown alone. When the processors 106a-106n determine that the driver 202 is alone, all input to the infotainment unit 352 may be assumed to be from the driver 202. In the locked mode of operation, the infotainment unit 352 may ignore the touch input (e.g., the touch input may be assumed to be the signal TOUCH_DRV). In another example, if other occupants were in the interior 402, the decision module 158 may weight the various factors and determine that the driver 202 is attempting to provide input to the infotainment unit 352 (e.g., based on the extended finger 464 reaching towards the location of the infotainment unit 352). If the driver 202 is determined to be providing input while the infotainment unit 352 is in the locked mode of operation, then the infotainment unit 352 may ignore the touch input (e.g., the computer vision operations may provide context about the touch input to determine that the touch input is the signal TOUCH_DRV instead of the signal TOUCH_PAS).

While the description of the detection of the body parts and/or the movement of the body parts is described with respect to determining whether the driver 202 is attempting to provide the input to the infotainment unit 352, similar analysis may be applicable to detecting and/or analyzing the body parts and/or the movement of the body parts of other occupants in the interior 402.

Figure 8:
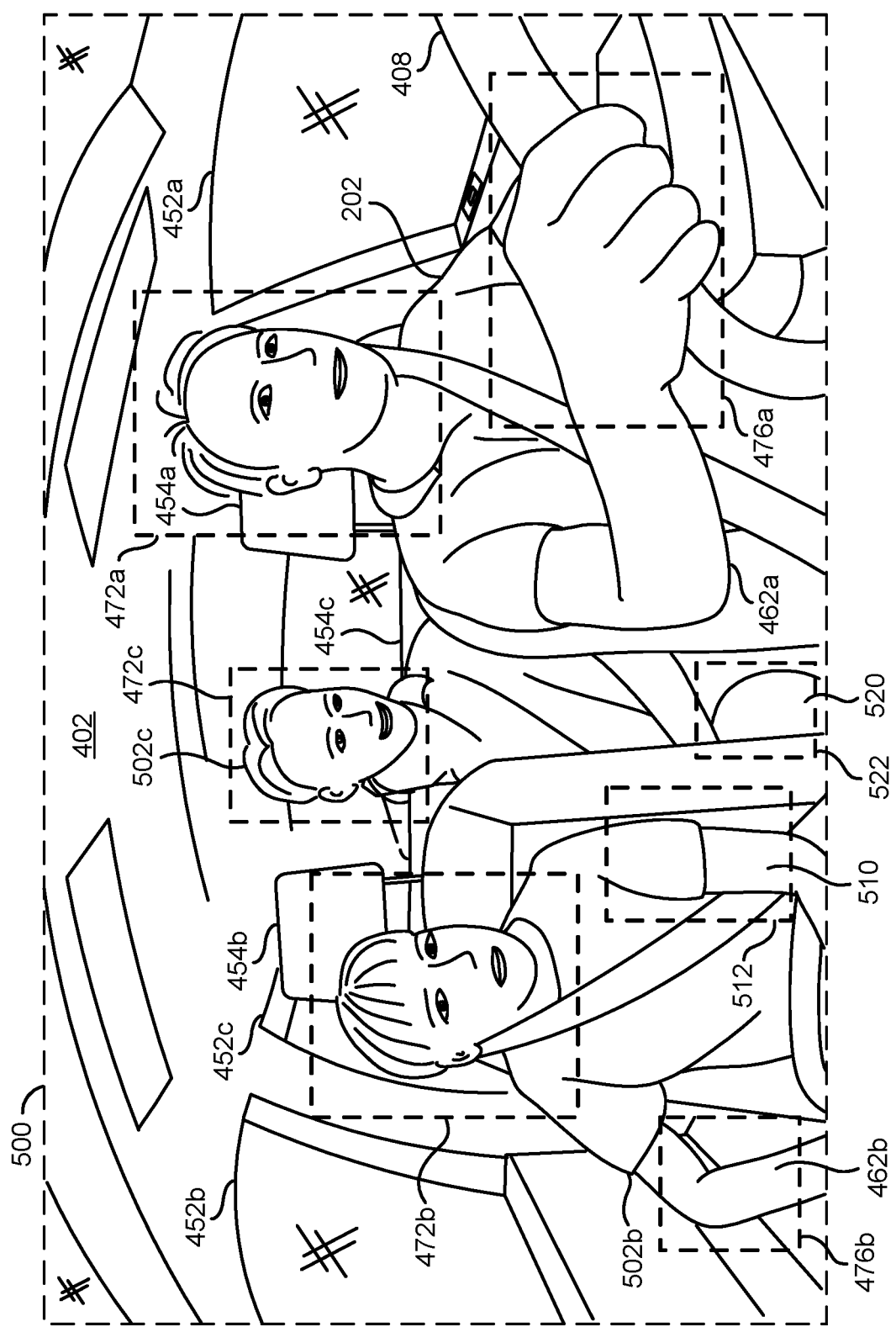
FIG. 8 is a diagram illustrating another example of a processor analyzing characteristics of passengers in a vehicle cabin.

Referring to FIG. 8, a diagram illustrating the processors 106a-106n analyzing characteristics of passengers in a video frame of a vehicle cabin is shown. The example video frame 500 may show the interior 402 of the ego vehicle 50 having a similar view as the example video frame 450 shown in association with FIG. 7. The example video frame 500 may represent in-cabin monitoring performed by the camera system 100. The steering wheel 408, the doors/windows 452a-452c, and the seats 454a-454c are shown as part of the interior 402. The driver 202 is shown in the seat 454a. The arm 462a of the driver is shown holding the steering wheel 408. The detected face 472a and the detected arm 476a are shown detected by the CNN module 150.

The example video frame 500 may provide an example of the driver 202 in the interior 402 of the ego vehicle 50 with additional passengers. Occupants (or passengers) 502b-502c are shown in the seats 454b-454c. The occupant 502b is shown as a child sitting in the passenger seat 454b. The occupant 502c is shown as an adult sitting in the back seat 454c. The CNN module 150 may be configured to determine that there are multiple occupants in the ego vehicle 50. When the processors 106a-106n determine that more occupants than the driver 202 are in the ego vehicle the processors 106a-106n may perform the computer vision operations to determine which of the occupants (e.g., the driver 202, the occupant 502b or the occupant 502c) is providing the input to the infotainment unit 352. In the example shown, the processors 106a-106n may determine that three occupants are in the ego vehicle 50 and apply metadata to the example video frame 500 indicating that three occupants were detected. In the example shown, two additional passengers 502b-502c are shown. However, the CNN module 150 may be configured to detect any number of additional passengers 502b-502n.

The processors 106a-106n may be configured to detect various body parts of the driver 202 and/or each of the passengers 502b-502c. The processors 106a-106n may be configured to distinguish which body parts correspond to each individual. Based on the movements of the body parts detected and the association of the body parts detected with the driver 202 and/or the passengers 502b-502c, the processors 106a-106n may determine whether the driver 202 has provided input to the infotainment unit 352 or whether one of the passengers 502b-502c has provided input to the infotainment unit 352.

The detected face 472a of the driver 202 is shown. Similar to the example described in association with FIG. 7, the processors 106a-106n may analyze the detected face 472a and/or the detected eyes 474a-474b (not shown) to determine whether the driver 202 is looking at the road 410, the location of the infotainment unit 352 and/or at something else. In the example shown, the driver 202 may be looking ahead at the road 410. The detected arm 476a of the driver 202 is shown. In the example shown, the detected arm 476a may be holding the steering wheel 408. Based on the location and/or movement of the body parts (e.g., the detected face 472a and the detected arm 476b, in the example shown), the processors 106a-106n may determine that the driver 202 is not attempting to provide input to the infotainment unit 352.

The processors 106a-106n may be configured to perform detection of the body parts for each of the occupants 502b-502c in the vehicle interior 402. In an example, the CNN module 150 may perform operations for each of the occupants 502b-502c similar to the operations performed on the driver 202 described in association with the description of FIG. 7. In the example video frame 500 shown, the infotainment unit 352 is not visible. The processors 106a-106n may store information about the interior 402 that comprises a location of the infotainment unit 352 with respect to the perspective of the capture devices 102a-102n. For example, the location of the infotainment unit 350 may be near the bottom and center of the example video frame 500.

A right arm 462b and a left arm 510 of the passenger 502b are shown. The right arm 462b and the left arm 510 may be examples of the body parts of the passenger 502b detected by the computer vision operations (e.g., shown as the detected right arm 476b and a detected left arm 512). The detected face 472b, the detected right arm 476b and the detect left arm 512 are shown as representative examples of the body parts detected by the CNN module 150. The CNN module 150 may be configured to detect other body parts of the passenger 502b.

The processors 106a-106n may analyze the video frame 500 and other temporally related video frames (e.g., video frames captured before and after the video frame 500) to determine the movement and/or behavior of the passenger 502b. In the example shown, the detected face 472b may be directed towards the center of the video frame 500, which may increase a confidence level that the passenger 502b may provide input to the infotainment unit 352. The detected left arm 512 is not shown reaching towards the infotainment unit 352, which may decrease a confidence level that the passenger 502b is providing input. Similarly, the right arm 476b is also not shown reaching towards the infotainment unit 352. Since the left arm 510 is closer to the infotainment unit 352 (e.g., closer to the center of the interior 402), the processors 106a-106n may place more weight on the movements of the left arm 510 as a factor for determining whether the passenger 502b is providing input to the infotainment unit 352 (e.g., a person is more likely to use the hand closes to the infotainment unit 352 to provide touch input). The processors 106a-106n may apply metadata to the video frame 500 indicating that the passenger 502b is not currently providing input (e.g., no arm or hand movement detected), but also indicate that the passenger 502b may be looking towards the infotainment unit 352 (e.g., may be used as part of the confidence level for a subsequent video frame if the passenger 502b does reach out).

From the perspective of the video frame 500, a right arm or a left arm of the passenger 502c are not visible (e.g., obscured by the seats 454a-454b). The detected face 472c of the passenger 502c is shown detected by the CNN module 150. A leg 520 of the passenger is shown as a detected leg 522 as an example of a body part detected by the CNN module 150. The detected face 472c and the detected leg 522 are shown as representative examples of the body parts detected by the CNN module 150. The CNN module 150 may be configured to detect other body parts of the passenger 502c.

The processors 106a-106n may analyze the video frame 500 and other temporally related video frames (e.g., video frames captured before and after the video frame 500) to determine the movement and/or behavior of the passenger 502c. In the example shown, the detected face 472c may be directed towards the right of the video frame 500, which may decrease a confidence level that the passenger 502c may provide input to the infotainment unit 352. Since neither of the arms of the passenger 502c are visible, the processors 106a-106n may decrease a confidence level that the passenger 502c is providing input. If the arms and/or hands of the passenger 502c were detected in front of the passenger 502b and/or the driver 202, the processors 106a-106n may determine that the passenger 502c is reaching towards the infotainment unit 352, which may increase the confidence level of the passenger 502c providing input to the infotainment unit 352. In the example shown, the processors 106a-106n may analyze the video frame 500, determine the movement and/or behavior of the passenger 502c and apply the metadata indicating that the passenger 502c is not reaching to provide input to the infotainment unit 352.

While the detected leg 522 of the passenger 502c is shown as an example body part detected, the leg 520 of passenger 502c, a leg of the driver 202 and/or a leg of other passengers may be generally irrelevant to determining who is providing input. In some embodiments, detecting a leg of the driver 202 and/or one of the passengers 502b-502c may be used as part of the process of determining which body parts belong to which occupant of the ego vehicle 50 (e.g., determine proximity to other body parts to group the detected body parts as belonging to a particular one of the occupants).

To determine which of the driver 202 or the passengers 502b-502n may be providing input to the infotainment unit 352, the processors 106a-106n may determine which of the detected body parts are the body parts of which individual. For example, if the detected arm 476a is providing the input, then the decision module 158 may need to know that the detected arm 476a is the arm 462a of the driver 202 to determine whether the input to the infotainment unit 352 should be rejected or accepted. In one example, the processors 106a-106n may use a proximity to the various seats 454a-454c to determine which body parts belong to which occupant. For example, the detected right arm 476a, the detected left arm 512 and the detected face 472b may located (both as X,Y coordinates and based on depth information) close to the passenger seat 454b. Based on the proximity of the detected face 472b, the detected right arm 476b and the detected left arm 512, the processors 106a-106n may determine that the body parts correspond to the passenger 502b located in the passenger seat 454b. In a similar example, the detected arm 476a and the detected face 472a may be located close to the driver seat 454a and the steering wheel 408. Based on the proximity of the detected face 472a and the detected arm 476a, the processors 106a-106n may determine that the body parts correspond to the driver 202 located in the driver seat 454a.

In addition to the proximity to the seats 454a-454c, the processors 106a-106n may analyze a relationship between the various body parts. For example, if the passenger 502b reaches the left arm 510 across the driver 202, proximity alone may be insufficient to determine which body part belongs to which occupant. While a few detected body parts are shown in the example video frame 500, the processors 106a-106n may detect additional body parts and determine the inter-relationship between the body parts. For example, in addition to detecting the detected left arm 512, the processors 106a-106n may detect the shoulders, chest and neck of the passenger 502b (e.g., body parts that are interconnected). When the detected arm 512 reaches across the driver 202, the processors 106a-106n may further detect movements of the shoulder, neck and chest of the passenger 502b to determine the interconnected movement of the body parts. For example, as the detected arm 512 reaches out, the interconnected movement of the shoulder (e.g., rotation and/or extension) may indicate that the body part belongs to the passenger 502b.

In addition to the proximity to the seats 454a-454c, the processors 106a-106n may analyze the orientation of the body parts. Particular orientations may be impossible and/or unlikely. For example, if the detected left arm 512 of the passenger 502b reaches across the driver 202, the processors 106a-106n may determine that a left arm is detected on a right side of the body of the driver 202. The orientation of the fingers and/or hand may be used to determine that the detected left arm 512 is a left arm/hand. Detecting a left arm on the right side of the driver 202 may be an impossible and/or unlikely scenario (particularly if a left arm of the driver 202 is already detected on the left side of the driver 202), which may decrease a confidence level that the detected left arm 512 belongs to the driver 202.

The proximity to the seats 454a-454c, the interconnection between the detected body parts and the orientation of the body parts with respect to each occupant of the ego vehicle 50 may be used by the processors 106a-106n to form groups of body parts associated with each of the vehicle occupants. Other factors may be analyzed by the processors 106a-106n to determine which body part belongs to which individual. Determining which body part belongs to the driver 202, the passenger 502b and the passenger 502c may be used to associate input to the infotainment unit 352 with a particular person in the ego vehicle 50. The factors analyzed by the processors 106a-106n to determine which body part belongs to which occupant may be varied according to the design criteria of a particular implementation.

The processors 106a-106n may analyze other factors when determining which of the driver 202 or the passengers 502b-502c have provided the touch input. In one example, whether the vehicle occupant is in one of the front seats 454a-454b or the rear seat 454c may be used as a factor. For example, the passenger 502c in the rear seat 454c may be less likely to provide input than the driver 202 in the front seat 454a.

Detecting which occupant has provided the input to the infotainment unit 352 may provide context to the touch input received by the CPU 354. In an example, the infotainment unit 352 may not be capable of distinguishing the touch input TOUCH_DRV from the touch input TOUCH_PAS. Determining the body parts that are providing the touch input using the computer vision analysis of the video frame 500 and associating that body part with a particular occupant in the ego vehicle 50 may be used to provide the context. For example, if the processors 106a-106n determine that the driver 202 has provided the touch input, then the context information may indicate that the touch input TOUCH_DRV has been received by the infotainment unit 352 and if the processors 106a-106n determine that the passenger 502b or the passenger 502c has provided the touch input, then the context information may indicate that the touch input TOUCH_PAS has been received by the infotainment unit 352. The processors 106a-106n may provide the control signal VCTRL to the infotainment unit 352 to provide the context about the touch input that would be otherwise unavailable to the infotainment unit 352. The CPU 354 may reject the touch input TOUCH_DRV from the driver 202 in the locked mode of operation and accept the touch input TOUCH_PAS from one of the passengers 502b-502c in the locked mode of operation.

In some embodiments, the camera system 100 may implement multiple camera angles in order to aggregate video data to make the determination about the movements and/or behavior of the driver 202 and/or the passengers 502b-502c. In one example, one camera (e.g., one of the capture devices 102a-102n) may provide a wide angle view of the interior 402 (e.g., as shown in the example video frame 500) and another camera may provide a directed view of one of the occupants 502b-502c and/or the driver 202. Capturing video frames from multiple angles may provide a richer data set for the computer vision operations. The processors 106a-106n may be configured to combine the information (e.g., the metadata) generated from the various angles to increase and/or decrease a confidence level about various objects that have been detected. In one example, a profile view of one of the occupants (e.g., the occupant 502b) may be obscured by a hand of the driver 202, which may make a determination of movement and/or behavior difficult. However, a front view may provide video data that may be used to movement and/or behavior. The number of camera angles captured may be varied according to the design criteria of a particular implementation.

Figure 9:
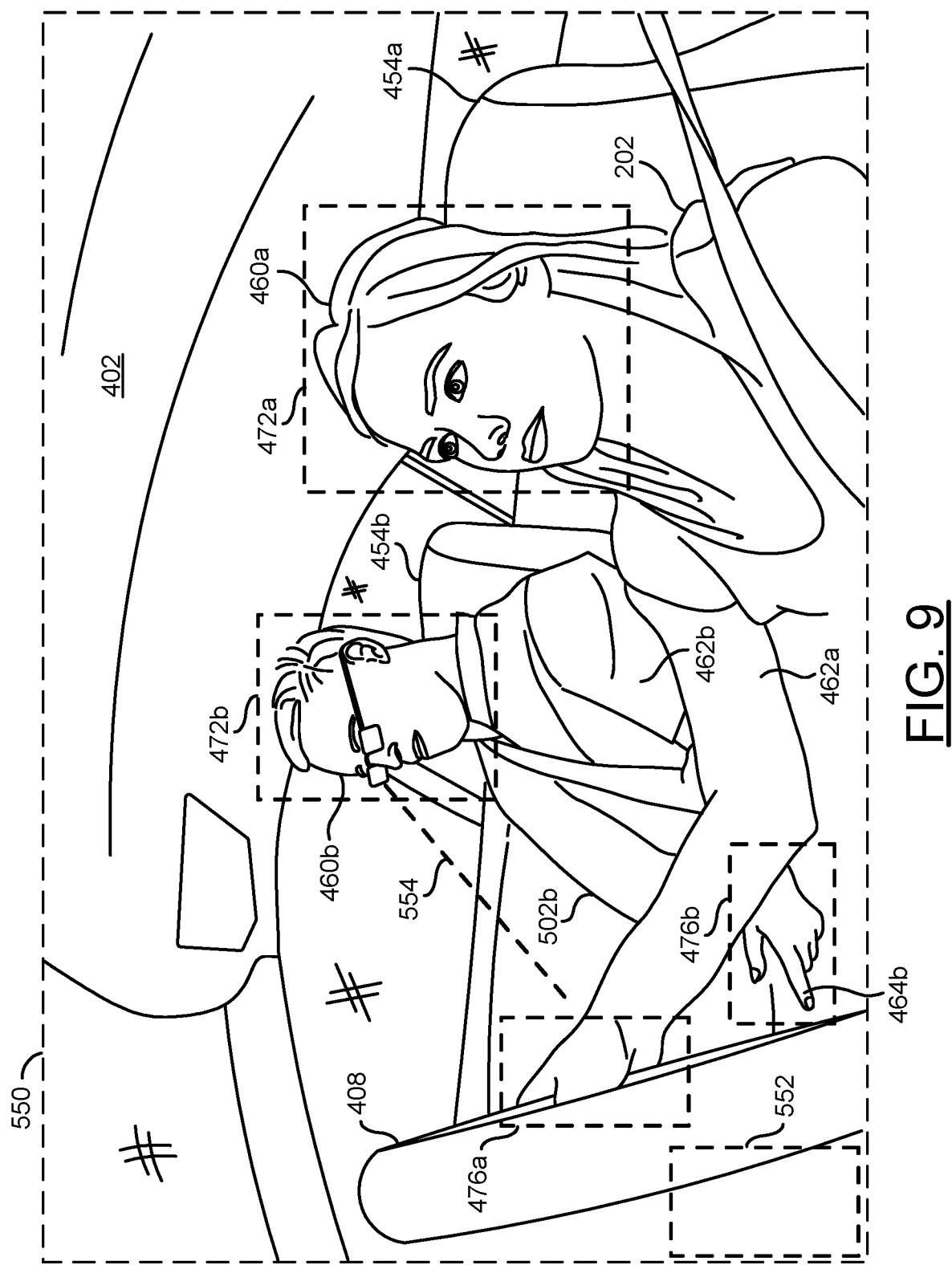
FIG. 9 is a diagram illustrating computer vision operations performed on another example video frame to distinguish between movements to provide input by a passenger and a driver.

Referring to FIG. 9, a diagram illustrating computer vision operations performed on another example video frame to distinguish between movements to provide input by a passenger and a driver is shown. The example video frame 550 is shown. The example video frame 550 may be one of the video frames FRAMES_A-FRAMES_N captured by one of the capture devices 102a-102n. The processors 106a-106n may analyze the pixel data arranged as the video frame 550.

In some embodiments, the video frame 550 may be a portion of a high resolution video frame. In an example, digital zooming, dewarping, oversampling and/or cropping may be performed on a full video frame to generate the video frame 550. In another example, the computer vision operations may be performed on a targeted subset of the full video frame. For example, if the full video frame is a 1080P resolution video frame, the video frame portion 550 may have sufficient detail for the CNN module 150 to detect objects. Limiting the analysis to the video frame 550 instead of the full video frame may reduce the number of calculations by eliminating unnecessary calculations. By eliminating unnecessary calculations, the processors 106a-106n may operate consuming less than 3 W of power. The method of generating the video frame 550 from a full video frame may be varied according to the design criteria of a particular implementation.

The example video frame 550 may be a video frame capturing a front row of seats of the interior 402 of the ego vehicle 50. The video frame 550 may comprise an example of in-cabin monitoring. The driver 202 is shown in the front seat 454a behind the steering wheel 408 and the passenger 502b is shown in the front seat 454b. The head 460a and the arm 462a of the driver 202 are shown. The head 460b, the arm 462b and the finger 464b of the passenger 502b are shown.

Detected heads/faces 472a-472b located by the processors 106a-106n are shown. The face detection 472a may correspond to the face of the driver 202. The face detection 472b may correspond to the face of the passenger 502b. The processors 106a-106n may further detect the seats 454a-454b. The processors 106a-106n may be configured to determine that the face detection 472a corresponds to the driver 202 located in the driver seat 454a. The processors 106a-106n may be configured to determine that the face detection 474b corresponds to the occupant 502b located in the passenger seat 454b. The detection of the various body parts and/or distinguishing the body parts of each occupant may be performed similar to the description associated with FIG. 8. The processors 106a-106n may be further configured to detect other passengers within the vehicle interior 402. In the example shown, only the two occupants, the driver 202 and the passenger 502b, may be in the vehicle interior 402. However, the number and/or locations of the occupants of the vehicle interior 402 capable of being detected, classified and/or analyzed by the processors 106a-106n may be varied according to the design criteria of a particular implementation.

The processors 106a-106n may be configured to determine the characteristics of the driver 202 and/or other occupants 502b-502n for a particular one of the seats 454a-454n. In an example, the characteristics of the driver 202 and/or the occupants 502b-502n may comprise an orientation of body parts. In the example shown, the right arm 462a is shown detected as the detected arm 476a. The characteristics of the driver 202 may comprise a location and/or orientation of the detected right arm 476a (e.g., holding the steering wheel 408). In another example, the characteristics of the driver 202 may comprise a direction and/or rotation of the detected head 472a. In the example shown, the driver 202 is shown looking forward (e.g., at the road 410). If the driver 202 is not looking at the road, the decision module 158 may determine that the driver 202 is potentially distracted (e.g., the driver 202 may be looking down to text on a smartphone or providing input to the infotainment unit 352). The types of characteristics analyzed may be varied according to the design criteria of a particular implementation.

In the example shown, the driver 202 is not alone. The processors 106a-106n may detect the driver 202 and the passenger 502b. The metadata applied to the video frame 550 may indicate that two occupants are within the ego vehicle 50. Since the driver 202 is not alone, the processors 106a-106n may perform the computer vision operations to determine which occupant is providing input to the infotainment unit 352.

A dotted box 552 is shown. The dotted box 552 may represent a location of the infotainment unit 352 with respect to the example video frame 550. The location 552 of the infotainment unit 352 may be varied based on the perspective captured by the capture devices 102a-102n. In the example shown, the location 552 of the infotainment unit 352 may be a bottom left corner of the video frame 550 (e.g., a location that corresponds with the center of the dashboard 406 between the seats 454a-454b). The processors 106a-106n may be configured to perform the analysis of the body parts and/or a behavior of the driver 202 and the occupant 502b with respect to the location 552 of the infotainment unit 352.

In the example shown, the detected face 472a is shown looking out the windshield 404 (e.g., looking at the road 410). The processors 106a-106n may determine that the driver 202 is not looking towards the location 552 of the infotainment unit 352, which may decrease a confidence level that the driver 202 is providing input. The processors 106a-106n may perform the computer vision operations to determine that the detected arm 476a of the driver 202 is holding the steering wheel 408. Since the detected arm 476a is holding the steering wheel 408, the processors 106a-106n may decrease a confidence level that a body part of the driver 202 is providing input to the infotainment unit 352.

The processors 106a-106n may analyze the passenger 502b. The detected head 472b of the passenger 502b is shown angled down towards the location 552 of the infotainment unit 352. A dotted line 554 is shown. The dotted line 554 may represent a projected gaze of the passenger 502b. The projected gaze 554 of the passenger 502b may be determined by the processors 106a-106n in response to analyzing the detected head 472b (e.g., an angle) and/or the detected eyes 474a-474b (e.g., a direction). In the example shown, the projected gaze 554 of the passenger 502b may be directed towards the location 552 of the infotainment unit 352. The decision module 158 may increase a confidence level that the passenger 502b is providing input to the infotainment unit 352 in response to determining that the projected gaze 554 is directed towards the location 552 of the infotainment unit 352.

The processors 106a-106n may analyze the detected arm 476b of the passenger 502b. The detected arm 476b is shown reaching towards the location 552 of the infotainment unit 352. In response to determining that the detected arm 476b that belongs to the passenger 502b is reaching towards the location 552 of the infotainment unit 352, the decision module 158 may increase a confidence level that the passenger 502b is providing input to the infotainment unit 352. The analyses of the detected hand 476b may determine that the finger 464b of the passenger 502b is extended. The extension of the finger 464b may be an indication that touch input may be provided (e.g., to interact with the touchscreen display 118i and/or to press one of the physical buttons 424a-424n). In response to the detection of the extension of the finger 464b of the passenger 502b, the decision module 158 may increase a confidence level that the passenger 502b may be the occupant of the ego vehicle 50 that provided the touch input to the infotainment unit 352.

In the example video frame 550, the detected hand 476b may appear as disembodied. For example, there is a discontinuity between an upper part of the arm 462b of the passenger 502b and the hand portion of the arm 462b. The processor 106a-106n may be configured to associate portions of body parts that appear with a discontinuity based on context. The processors 106a-106n may be configured to perform depth analysis to determine association of body parts when a discontinuity is detected. In the example shown, the right arm 462a of the driver 202 is shown located in front of passenger 502b (e.g., the right arm 462a is closer to the lens of the capture device that captured the video frame 550). The arm 462a of the driver 202 may be the object causing the discontinuity of the arm 462b. The processors 106a-106n may use the depth of the discontinuous portions of the arm 462b to associate the arm 462b as a body part of the passenger 502b. The processors 106a-106n may also utilize pre-defined knowledge of human body parts (e.g., general measurements, proportions and/or orientations) to associate the discontinuous portions of the arm 462b with the passenger 502b. The pre-defined knowledge of human body parts may be stored as part of the LUT 170. The calculations performed by the processors 106a-106n to associate various body parts to particular occupants may be varied according to the design criteria of a particular implementation.

The decision module 158 may be configured to compare a confidence level for input provided by the driver 202 with a confidence level for input provided by the passenger 502b to determine which occupant has provided input to the infotainment unit 352. In the example shown, the characteristics determined about the driver 202 may result in a low confidence level for input provided to the infotainment unit 352 by the driver 202. The characteristics determined about the passenger 502b may result in a high confidence level for input provided to the infotainment unit 352 by the passenger 502b. In an example, determining that the confidence level for the passenger 502b is higher than the confidence level for the driver 202 may be sufficient for the decision module 158 to determine that the input was provided by the passenger 502b and not the driver 202. In another example, the decision module 158 may not determine that input was provided by a particular occupant unless the confidence level for one occupant is above a pre-defined threshold (e.g., regardless of a comparison with a confidence of another occupant).

When the infotainment unit 352 is in the active mode of operation (e.g., the ego vehicle 50 is idle as determined by the sensors 114 and/or as determined by performing computer vision operations on an area external from the ego vehicle 50 to detect movement), then the infotainment unit 352 may accept all input. In some embodiments, the processors 106a-106n may not perform the computer vision operations to determine who provided input unless the infotainment unit 352 is in the locked mode of operation. When the infotainment unit 352 is in the locked mode of operation, the decision module 158 may generate the signal VCTRL in response to detecting that the passenger 502b provided the touch input to the infotainment unit 352. The signal VCTRL may enable the infotainment unit 352 to accept touch input in the locked mode of operation when the touch input has been provided by an occupant other than the driver 202. In some embodiments, the decision module 158 may generate the signal VCTRL even when the driver 202 provides the input as contextual information. The CPU 354 may decide to reject the input when the signal VCTRL indicates that the driver 202 provided the input to the infotainment unit 352.

Figure 10:
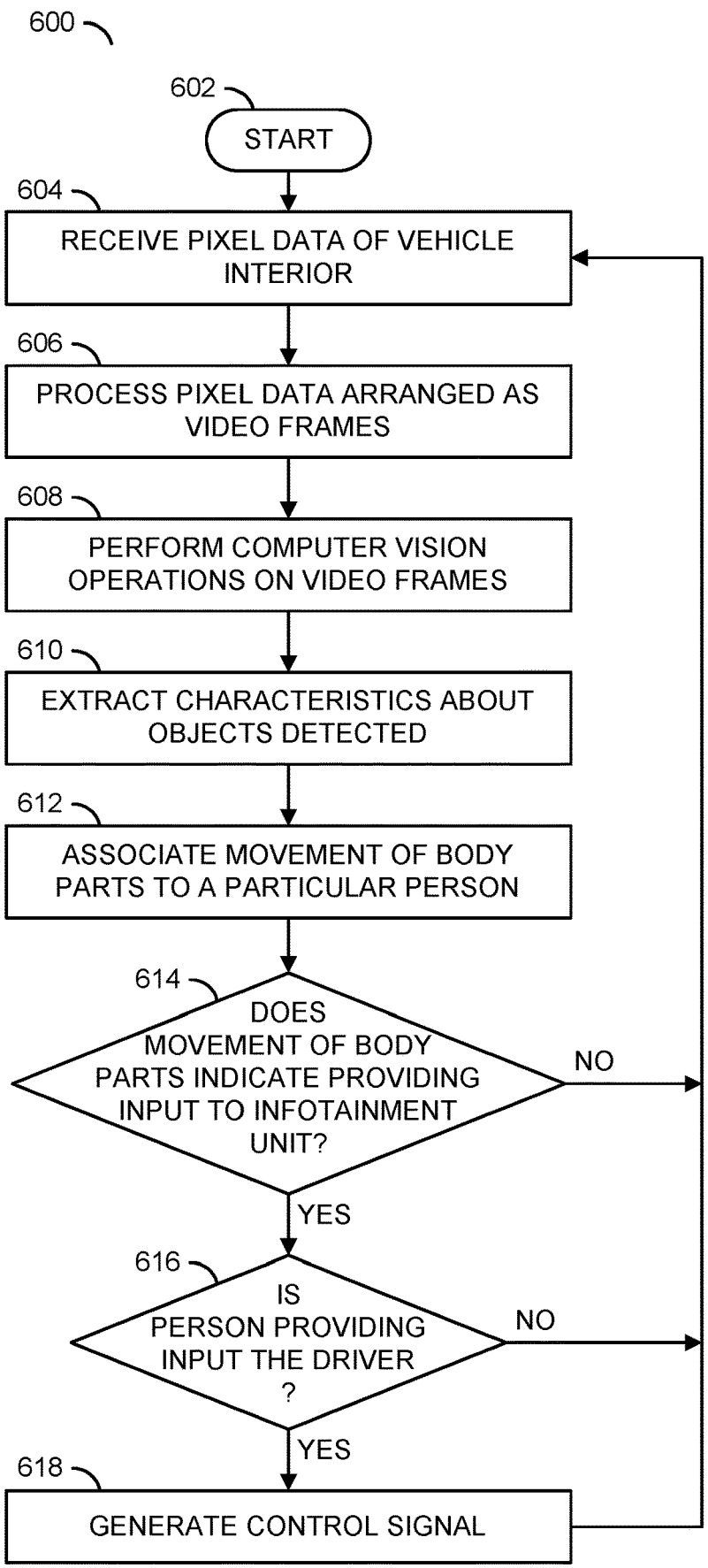
FIG. 10 is a flow diagram illustrating a method for implementing an infotainment system permission control while driving using in-cabin monitoring.

Referring to FIG. 10, a method (or process) 600 is shown. The method 600 may implement an infotainment system permission control while driving using in-cabin monitoring. The method 600 generally comprises a step (or state) 602, a step (or state) 604, a step (or state) 606, a step (or state) 608, a step (or state) 610, a step (or state) 612, a decision step (or state) 614, a decision step (or state) 616, and a step (or state) 618.

The step 602 may start the method 600. In the step 604, the processors 106a-106n may receive pixel data. The pixel data received may be pixel data of the vehicle interior 402. One or more of the capture devices 102a-102n may present the signals FRAMES_A-FRAMES_N to the processors 106a-106n. Next, in the step 606, the processors 106a-106n may process the pixel data arranged as video frames. For example, one or more of the dedicated hardware modules 180a-180n and/or the video processing pipeline 156 may generate video frames from the signals FRAMES_A-FRAMES_N. Next, the method 600 may move to the step 608.

In the step 608, the processors 106a-106n may perform computer vision operations on the video frames. In an example, the video processing pipeline 156 may present the video frames to the CNN module 150 as the video frames are generated to enable real-time computer vision operations. Next, in the step 610, the CNN module 150 may extract characteristics about the objects detected. In an example, the CNN module 150 may perform object detection and/or determine the characteristics of the objects detected. The object detection, along with classification and/or segmentation, may be part of the computer vision operations performed by the CNN module 150. The characteristics detected may comprise a distance, orientation and/or location of the body parts of each occupant within the vehicle interior 402. In the step 612, the CNN module 150 may be configured to associate the movement of the body parts detected to a particular person. For example, the CNN module 150 may associate movements of the detected arm 476a to the driver 202 and/or associate movements of the detected arm 476b and the detected head 472b to the passenger 502b. Next, the method 600 may move to the decision step 614.

In the decision step 614, the decision module 158 may determine whether the movement of the body parts indicate providing the input TOUCH_DRV (or TOUCH_PAS) to the infotainment unit 352. In one example, the decision module 158 may determine whether the driver 202 and/or one of the passengers 502b-502n are reaching toward the infotainment unit 352 (or looking at the infotainment unit 352 or extending a finger toward the infotainment unit 352). If the movement of the body parts does not indicate providing input to the infotainment unit 352, then the method 600 may return to the step 604. If the movement of the body parts does indicate providing input to the infotainment unit 352, then the method 600 may move to the decision step 616.

In the decision step 616, the decision module 158 may determine whether the person detected providing input to the infotainment unit 352 is the driver 202. In an example, if the body parts detected providing input to the infotainment unit 352 are the detected head 472a, the detected eyes 474a-474b, the detected arm 476a and/or the detected finger 478a of the driver 202 then the person providing input may be the driver 202. If the driver 202 is not the person detected providing input to the infotainment unit 352, then the method 600 may return to the step 604. If the driver 202 is the person detected providing input to the infotainment unit 352, then the method 600 may move to the step 618. In the step 618, the processors 106a-106n may generate the control signal VCTRL. The signal VCTRL may be configured to cause the CPU 354 of the infotainment unit 352 to disable input (e.g., ignore the input TOUCH_DRV). In some embodiments, the processors 106a-106n may generate the signal VCTRL when one of the passengers 502b-502n is determined to provide the input (e.g., the signal VCTRL may instruct the CPU 354 to enable accepting the input TOUCH_PAS). Next, the method 600 may return to the step 604.

Figure 11:
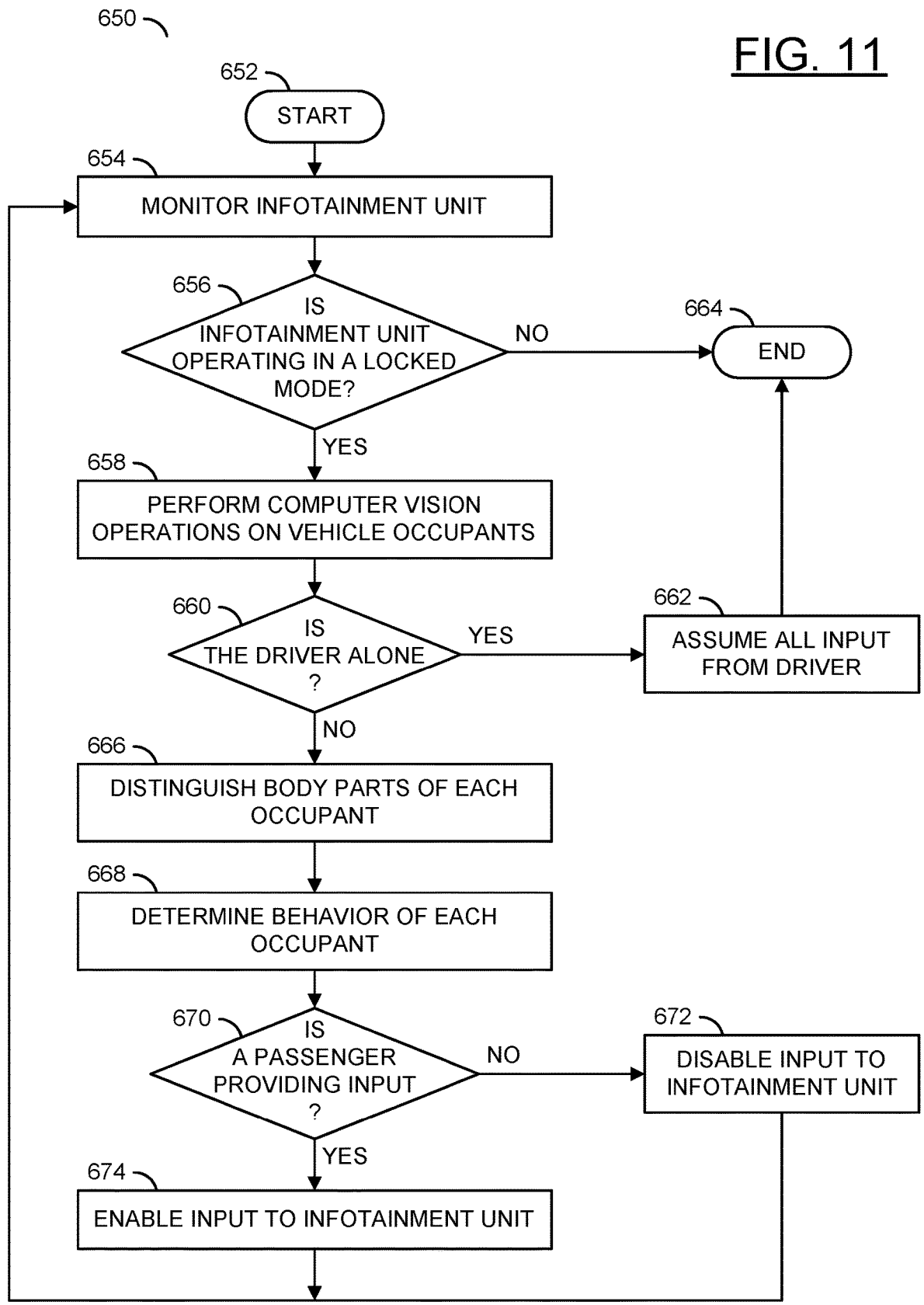
FIG. 11 is a flow diagram illustrating a method for distinguishing body parts and/or behavior of each occupant of a vehicle when the infotainment system is in a locked mode of operation.

Referring to FIG. 11, a method (or process) 650 is shown. The method 650 may distinguish body parts and/or behavior of each occupant of a vehicle when the infotainment system is in a locked mode of operation. The method 650 generally comprises a step (or state) 652, a step (or state) 654, a decision step (or state) 656, a step (or state) 658, a decision step (or state) 660, a step (or state) 662, a step (or state) 664, a step (or state) 666, a step (or state) 668, a decision step (or state) 670, a step (or state) 672, and a step (or state) 674.

The step 652 may start the method 650. In the step 654, the processors 106a-106n may monitor the infotainment unit 352. In an example, the processors 106a-106n may receive the signal LOCK to determine the operating status (e.g., the mode of operation) of the infotainment unit 352. Next, the method 650 may move to the decision step 656.

In the decision step 656, the processors 106a-106n may determine whether the infotainment unit 352 is operating in the locked mode of operation. In one example, the processors 106a-106n may determine that the infotainment unit 352 is operating in the locked mode of operation in response to the CPU 354 presenting the signal LOCK. If the infotainment unit 352 is not operating in the locked mode of operation, then the method 650 may move to the step 664. In an example, when the infotainment unit 352 is not in the locked mode of operation, the processors 106a-106n may save power by not performing the computer vision operations to determine which of the occupants of the ego vehicle 50 is providing input (e.g., analysis may be unnecessary since when the infotainment unit 352 is not locked, all input may be accepted). If the infotainment unit 352 is operating in the locked mode of operation, then the method 650 may move to the step 658. In the step 658, the processors 106a-106n may perform the computer vision operations on the occupants (e.g., the driver 202 and/or the passengers 502b-502n) of the ego vehicle 50. Next, the method 650 may move to the decision step 660.

In the decision step 660, the processors 106a-106n may determine whether the driver 202 is alone in the ego vehicle 50. In an example, the CNN module 150 may perform analysis of the pixel data arranged as video frames to determine whether any of the passengers 502b-502n are within the vehicle interior 402. If the driver 202 is alone, then the method 650 may move to the step 662. In the step 662, the decision module 158 and/or the infotainment unit 352 may operate with an assumption that all of the input to the infotainment unit 352 is from the driver 202. For example, using the assumption that all input is from the driver 202, the processors 106a-106n may provide the CPU 354 context that may indicate that all of the input is the input signal TOUCH_DRV (e.g., from the driver 202) since no passengers are present to provide the input signal TOUCH_PAS). Next, the method 650 may move to the step 664. The step 664 may end the method 650. In the decision step 660, if the decision module 158 determines that the driver 202 is not alone (e.g., one or more of the passengers 502*b*-502*n* are present), then the method 650 may move to the step 666.

In the step 666, the CNN module 150 may distinguish the body parts detected for each occupant of the ego vehicle 50. For example, the processors 106*a*-106*n* may determine which of the body parts detected are associated with the driver 202 and which of the body parts detected are associated with each of the passengers 502*b*-502*n* (e.g., based on proximity to each other, based on orientation, based on general human anatomy, etc.). Next, in the step 668, the processors 106*a*-106*n* may determine the behavior of each of the occupants based on the movement of the body parts over a sequence of the video frames captured. Next, the method 650 may move to the decision step 670.

In the decision step 670, the decision module 158 may determine whether the input provided to the infotainment unit 352 is from one of the passengers 502*b*-502*n* (e.g., not from the driver 202). If the input detected (e.g., based on the behavior of each occupant), is not from one of the passengers 502*b*-502*n*, the method 650 may move to the step 672. In the step 672, the decision module 158 may determine that the input is from the driver 202 and the processors 106*a*-106*n* may disable input to the infotainment unit 352 (e.g., the signal VCTRL may provide the context for the CPU 354 to determine that the input is the input signal TOUCH_DRV). Next, the method 650 may return to the step 654. In the decision step 670, if the input detected is from one of the passengers 502*b*-502*n*, then the method 650 may move to the step 674. In the step 674, the processors 106*a*-106*n* may enable input to the infotainment unit 352 (e.g., the signal VCTRL may provide context for the CPU 354 to determine that the input is the input signal TOUCH_PAS, which may be accepted by the infotainment unit 352). Next, the method 650 may return to the step 654.

Figure 12:
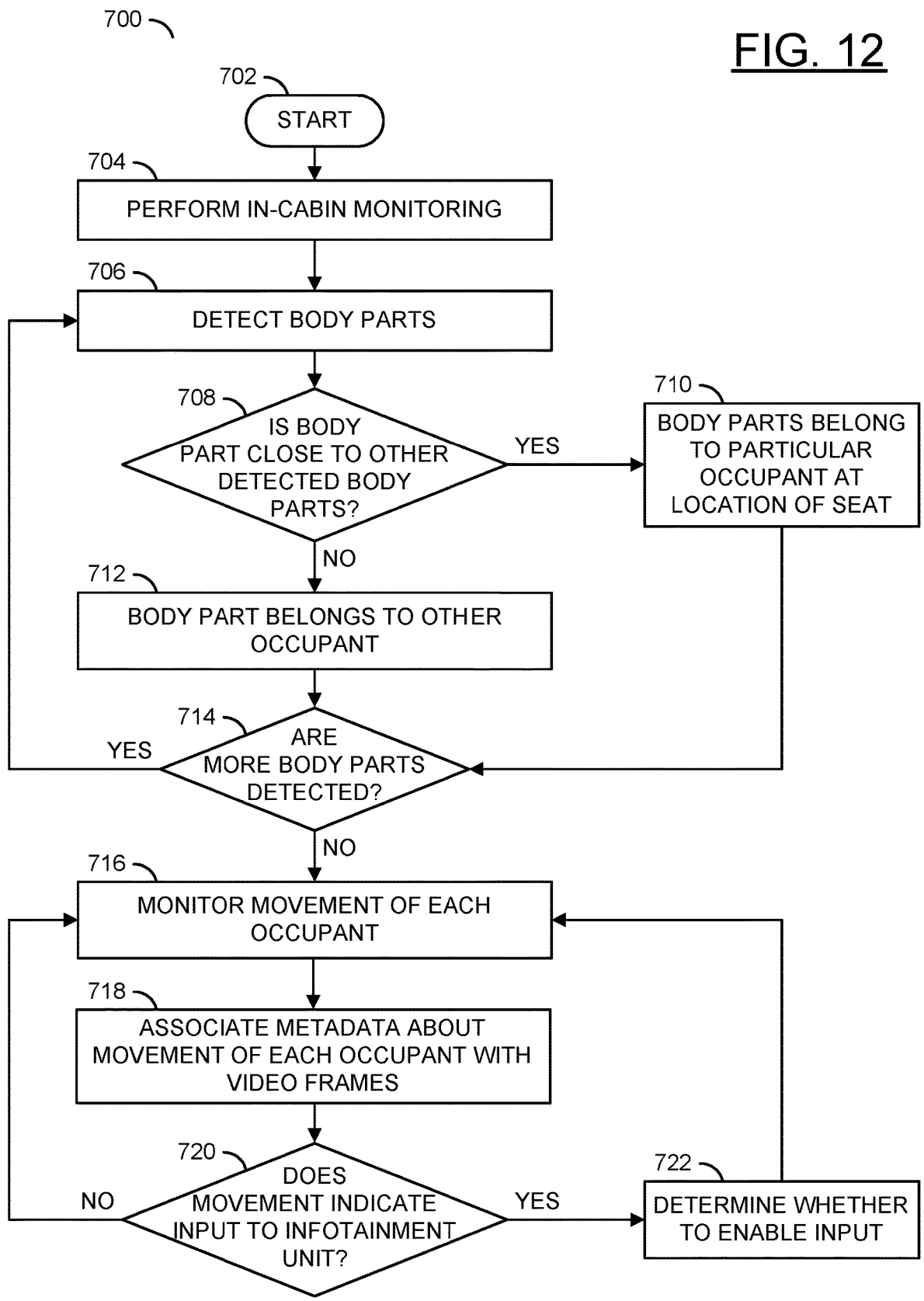
FIG. 12 is a flow diagram illustrating a method for associating body parts to a particular occupant in a vehicle.

Referring to FIG. 12, a method (or process) 700 is shown. The method 700 may associate body parts to a particular occupant in a vehicle. The method 700 generally comprises a step (or state) 702, a step (or state) 704, a step (or state) 706, a decision step (or state) 708, a step (or state) 710, a step (or state) 712, a decision step (or state) 714, a step (or state) 716, a step (or state) 718, a decision step (or state) 720, and a step (or state) 722.

The step 702 may start the method 700. In the step 704, the processors 106*a*-106*n* may perform in-cabin monitoring. In an example, the processors 106*a*-106*n* may analyze a sequence of video frames over time of the interior 402 of the ego vehicle 50. Next, in the step 706, the processors 106*a*-106*n* may detect body parts (e.g., the detected head 472*a*, the detected head 472*b*, the detected arm 476*a*, the detected left arm 512, etc.). Next, the method 700 may move to the decision step 708.

In the decision step 708, the processors 106*a*-106*n* may determine whether the detected body part is close to other detected body parts. In an example, the processors 106*a*-106*n* may compare a distance between the detected head 472*a* and the detected arm 476*b*. If the detected body parts are close to other detected body parts, then the method 700 may move to the step 710. In the step 710, the decision module 158 may determine that the body parts may be a group of body parts that belong to a particular occupant at the location of one of the seats 454*a*-454*n*. In an example, the detected head 472*a* may be close to the detected arm 476*a*, which may be a group of body parts of the driver 202 in the seat 454*a*. Next, the method 700 may move to the decision step 714.

In the decision step 708, if the body parts are not close to other detected body parts near one of the seats 454*a*-454*n*, then the method 700 may move to the step 712. In the step 712, the decision module 158 may determine that the body part detected belongs to another occupant (e.g., the detected head 472*a* may be near the seat 454*a* and the detected arm 476*b* may be near the seat 454*b*, which may indicate that the detected head 472*a* and the detected arm 476*b* belong to different people). In another example, multiple detections of the same body parts (e.g., more than would be on a human body) may be determined to belong to different people (e.g., the detected head 472*a* and the detected head 472*b* may be assumed to belong to different people). Next, the method 700 may move to the decision step 714.

In the decision step 714, the processors 106*a*-106*n* may determine whether more body parts have been detected. If more body parts have been detected, the method 700 may return to the step 706. The processors 106*a*-106*n* may continually analyze the detected body parts (in sequence or all in parallel) to associate each body part detected to a corresponding one of the occupants. If no more body parts have been detected (e.g., all body parts have been associated with a corresponding one of the occupants), then the method 700 may move to the step 716. In the step 716, the processors 106*a*-106*n* may monitor the movement of each occupant in the interior 402. Next, in the step 718, the processors 106*a*-106*n* may associate metadata about the movement of each of the occupants with the video frames. The metadata may enable the processors 106*a*-106*n* to track the movement of each occupant over time (e.g., compare current location data of the body parts to previously detected locations to determine a trend in movement). The metadata may also enable the processors 106*a*-106*n* to compare inferences made at different times to determine an overall indication of whether the occupant is attempting to provide input (e.g., the detected head 472*a* may look at the infotainment unit first, then look back at the road 410, which may be tagged in the metadata at an earlier time and then the detected arm 476*a* may reach towards the infotainment unit 352 at a later time). Next, the method 700 may move to the decision step 720.

In the decision step 720, the processors 106*a*-106*n* may determine whether the movement detected indicates input to the infotainment unit 352. If the movement does not indicate that one of the occupants is attempting to provide input to the infotainment unit 352, then the method 700 may return to the step 716. If the movement does indicate one of that one of the occupants is attempting to provide input to the infotainment unit 352, then the method 700 may move to the step 722. In the step 722, the processors 106*a*-106*n* may determine whether or not to allow the infotainment unit 352 to enable input (e.g., based on whether the person providing input is the driver 202). Next, the method 700 may return to the step 716.

Figure 13:
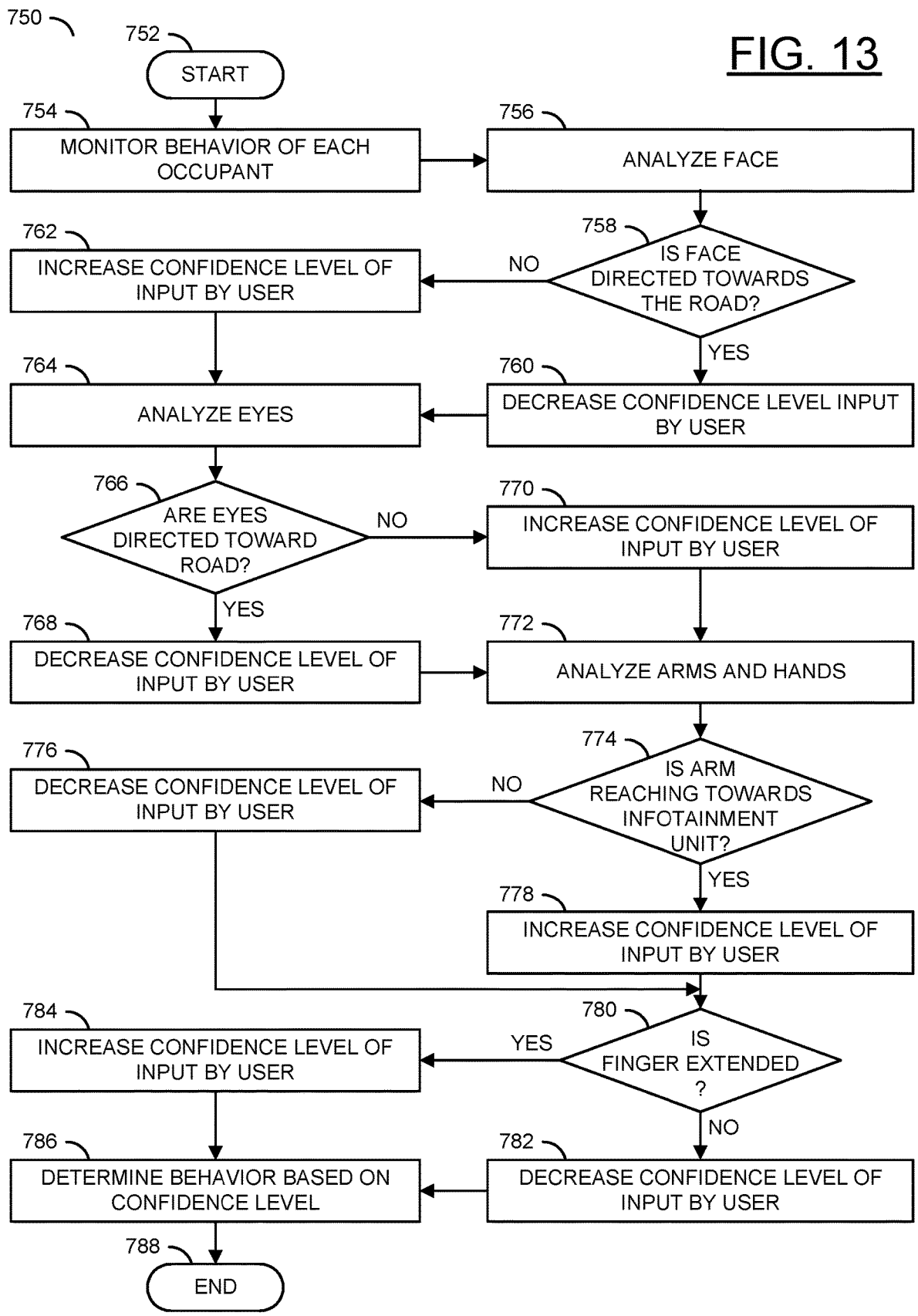
FIG. 13 is a flow diagram illustrating a method for determining which occupant has provided input to the infotainment unit using computer vision analysis.

Referring to FIG. 13, a method (or process) 750 is shown. The method 750 may determine which occupant has provided input to the infotainment unit using computer vision analysis. The method 750 generally comprises a step (or state) 752, a step (or state) 754, a step (or state) 756, a decision step (or state) 758, a step (or state) 760, a step (or state) 762, a step (or state) 764, a decision step (or state) 766, a step (or state) 768, a step (or state) 770, a step (or state) 772, a decision step (or state) 774, a step (or state) 776, a step (or state) 778, a decision step (or state) 780, a step (or state) 782, a step (or state) 784, a step (or state) 786, and a step (or state) 788.

The step 752 may start the method 750. In the step 754, the processors 106*a*-106*n* may monitor the behavior of each occupant in the interior 402 of the ego vehicle 50. Next, in the step 756, the processors 106a-106n may analyze the characteristics of the detected face 472a. Next, the method 750 may move to the decision step 758.

In the decision step 758, the processors 106a-106n may determine whether the detected face 472a is directed towards the road 410 or towards the infotainment unit 352. For example, if the detected face 472a of the driver 202 is directed towards the road 410, then the driver 202 may be less likely to be providing input to the infotainment unit 352. If the detected face 472a is directed towards the road 410, then the method 750 may move to the step 760. In the step 760, the decision module 158 may decrease a confidence level of input being provided by the user. Next, the method 750 may move to the step 764. In the decision step 758, if the detected face 472a is not directed towards the road 410, then the method 750 may move to the step 762. In the step 762, the decision module 158 may increase a confidence level of the input being provided by the user. Next, the method 750 may move to the step 764. In the step 764, the processors 106a-106n may analyze the characteristics of the detected eyes 474a-474b. Next, the method 750 may move to the decision step 766.

In the decision step 766, the processors 106a-106n may determine whether the detected eyes 474a-474b are directed towards the road 410 or towards the infotainment unit 352. For example, if the detected eyes 474a-474b of the driver 202 are directed towards the road 410, then the driver 202 may be less likely to be providing input to the infotainment unit 352. If the detected eyes 474a-474b are directed towards the road 410, then the method 750 may move to the step 768. In the step 768, the decision module 158 may decrease a confidence level of input being provided by the user. Next, the method 750 may move to the step 772. In the decision step 766, if the detected eyes 474a-474b are not directed towards the road 410, then the method 750 may move to the step 770. In the step 770, the decision module 158 may increase a confidence level of the input being provided by the user. Next, the method 750 may move to the step 772. In the step 772, the processors 106a-106n may analyze the characteristics of the detected arms and hands 476a. Next, the method 750 may move to the decision step 774.

In the decision step 774, the processors 106a-106n may determine whether the detected arm 476a is reaching towards the infotainment unit 352. For example, if the detected arm 476a of the driver 202 is reaching towards the infotainment unit 352, then the driver 202 may be more likely to be providing input to the infotainment unit 352. If the detected arm 476a is not reaching towards the infotainment unit 352, then the method 750 may move to the step 776. In the step 776, the decision module 158 may decrease a confidence level of input being provided by the user. Next, the method 750 may move to the decision step 780. In the decision step 774, if the detected arm 476a is reaching towards the infotainment unit 352, then the method 750 may move to the step 778. In the step 778, the decision module 158 may increase a confidence level of the input being provided by the user. Next, the method 750 may move to the decision step 780.

In the decision step 780, the processors 106a-106n may determine whether the detected finger 478 is extended. For example, if the detected finger 478 of the driver 202 is extended towards the infotainment unit 352, then the driver 202 may be more likely to be providing input to the infotainment unit 352. If the detected finger 478 is not extended towards the infotainment unit 352, then the method 750 may move to the step 782. In the step 782, the decision module 158 may decrease a confidence level of input being provided by the user. Next, the method 750 may move to the step 786. In the decision step 780, if the detected finger 478 is extended towards the infotainment unit 352, then the method 750 may move to the step 784. In the step 784, the decision module 158 may increase a confidence level of the input being provided by the user. Next, the method 750 may move to the step 786.

In the step 786, the decision module 158 may determine a behavior of the user (e.g., the driver 202) based on the calculated confidence level. The confidence level may be determined based on an aggregate of multiple factors. For example, the decision module 158 may determine the cumulative result of the various increases or decreases performed in the steps 760-762, the steps 768-770, the steps 776-778, the steps 782-784 and/or other increase/decreases due to other factors analyzed. Based on the analysis of multiple factors (e.g., the behavior of various body parts), the decision module 158 may calculate an aggregate confidence level. The decision module 158 may use the aggregate confidence level to determine whether the behavior of the user is consistent with a person providing input to the infotainment unit 352. For example, the processors 106a-106n may generate the control signal VCTRL to enable/disable input to the infotainment unit 352 based on the aggregate confidence level determined by the decision module 158. Next, the method 750 may move to the step 788. The step 788 may end the method 750.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data of an interior of a vehicle; and
a processor configured to (i) process said pixel data arranged as video frames, (ii) perform computer vision operations to detect objects in said video frames, (iii) extract characteristics about said objects detected, (iv) associate movement of a body part to a particular person in said vehicle based on said characteristics extracted and (v) generate a control signal in response to said movement of said body part of said particular person, wherein (a) a device is configured to operate in a locked mode that prevents input when said vehicle is in motion, (b) said control signal is configured to enable said device to receive said input when said device is in said locked mode, (c) said movement of said body part detected by said processor comprises providing said input to said device and (d) said control signal is generated only when said particular person associated with said movement of said body part corresponds to an occupant in said vehicle that is not a driver of said vehicle.

2. The apparatus according to claim 1, wherein said computer vision operations are performed by (a) applying a feature detection window to each of a plurality of layers in each of said video frames and (b) sliding said feature detection window along each of said plurality of layers.

3. The apparatus according to claim 2, wherein said computer vision operations further comprise applying a convolution operation using matrix multiplication of said plurality of layers defined by said feature detection window.

4. The apparatus according to claim 2, wherein said computer vision operations further comprise (i) performing feature extraction based on weight values for each of said plurality of layers in said video frames and (ii) said weight values are determined by said processor analyzing training data prior to said feature extraction.

5. The apparatus according to claim 1, wherein said processor is configured to implement in-cabin monitoring.

6. The apparatus according to claim 1, wherein said device comprises an infotainment unit installed in said vehicle.

7. The apparatus according to claim 1, wherein said input comprises touch received by a touchscreen interface.

8. The apparatus according to claim 1, (i) said device operates in said locked mode when said vehicle is moving and (ii) said device operates in an active mode that enables said input when said vehicle is idle.

9. The apparatus according to claim 1, wherein said body part comprises arms and hands.

10. The apparatus according to claim 1, wherein said processor is further configured to distinguish said body part of said particular person from a similar body part of another person within said vehicle.

11. The apparatus according to claim 10, wherein said body part comprises an arm and hand of a person in a passenger seat and said similar body part of another person comprises an arm and hand of said driver of said vehicle.

12. The apparatus according to claim 1, wherein said processor is further configured to (i) determine whether said driver is alone in said vehicle and (ii) disable said control signal when said driver is alone in said vehicle.

13. The apparatus according to claim 1, wherein said occupant comprises a passenger riding in said vehicle with said driver.

14. The apparatus according to claim 1, wherein said control signal is configured to enable said input to said device when provided by said occupant while disabling said input to said device when provided by said driver.

15. The apparatus according to claim 1, wherein said processor is configured to correlate said input received by said device with said movement of said body part by said particular person based on metadata associated with said video frames.

16. The apparatus according to claim 1, wherein said device operates in said locked mode to prevent driver distraction and said processor enables said input to said device that does not result in said driver distraction.

17. The apparatus according to claim 1, wherein (i) said device is configured to receive said input without context about said occupant that provided said input and (ii) and said control signal is configured to provide said context to said device.

18. The apparatus according to claim 1, wherein (i) said locked mode of said device is a driver distraction prevention feature and (ii) said processor is configured to narrow an application of said driver distraction prevention feature by determining if said input is provided by said driver.

19. The apparatus according to claim 1, wherein said apparatus is configured to provide an infotainment system permission control while driving using in-cabin monitoring.

20. An apparatus comprising:
an interface configured to receive pixel data of an interior of a vehicle; and
a processor configured to (i) process said pixel data arranged as video frames, (ii) perform computer vision operations to detect objects in said video frames, (iii) extract characteristics about said objects detected, (iv) associate movement of a body part to a particular person in said vehicle based on said characteristics extracted and (v) generate a control signal in response to said movement of said body part of said particular person, wherein
(a) a device is configured to operate in a locked mode that prevents input when said vehicle is in motion,
(b) said control signal is configured to enable said device to receive said input when said device is in said locked mode,
(c) said movement of said body part is associated to said particular person by determining a proximity and orientation of said body part compared to body parts of a number of occupants detected by said computer vision operations, and
(d) said control signal is generated only when said particular person associated with said movement of said body part corresponds to one of said occupants in said vehicle that is not a driver of said vehicle.

* * * * *